Figure 1:
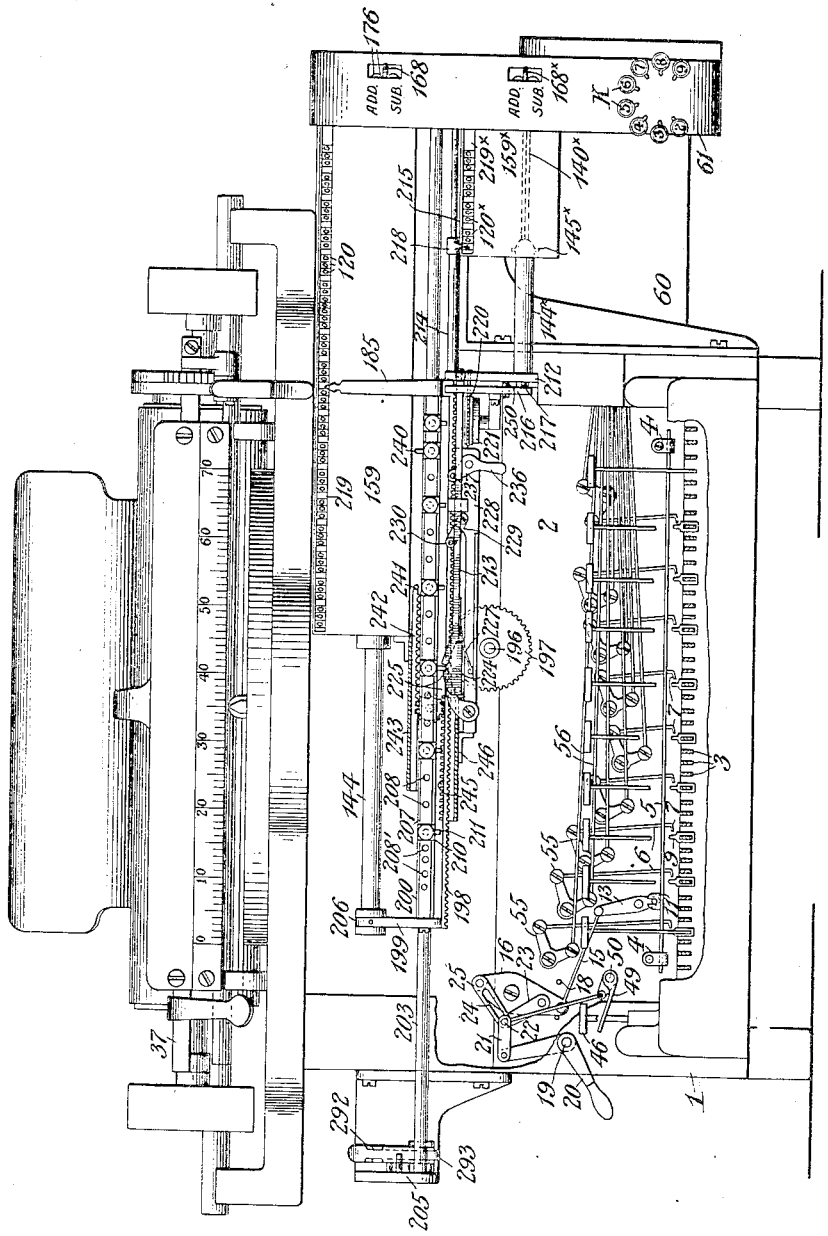

W. WRIGHT.
COMBINED TYPE WRITING AND COMPUTING MACHINE.
APPLICATION FILED MAY 12, 1910.

1,287,559.

Patented Dec. 10, 1918.
10 SHEETS—SHEET 2.

Witnesses:
John A. Pennie
Sigmund Schiff

Inventor
Walter Wright
By B.C. Stickney
his Attorney.

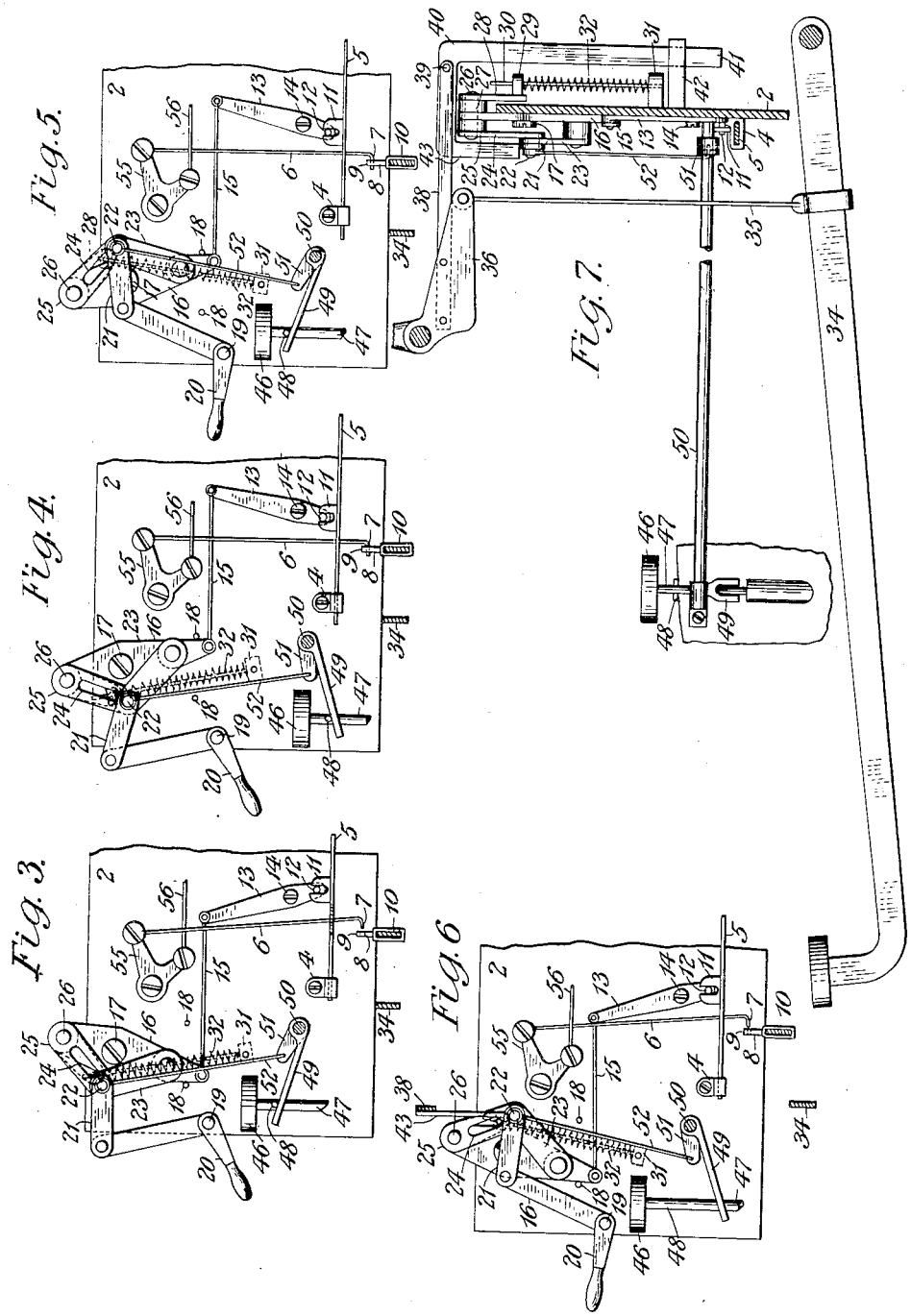

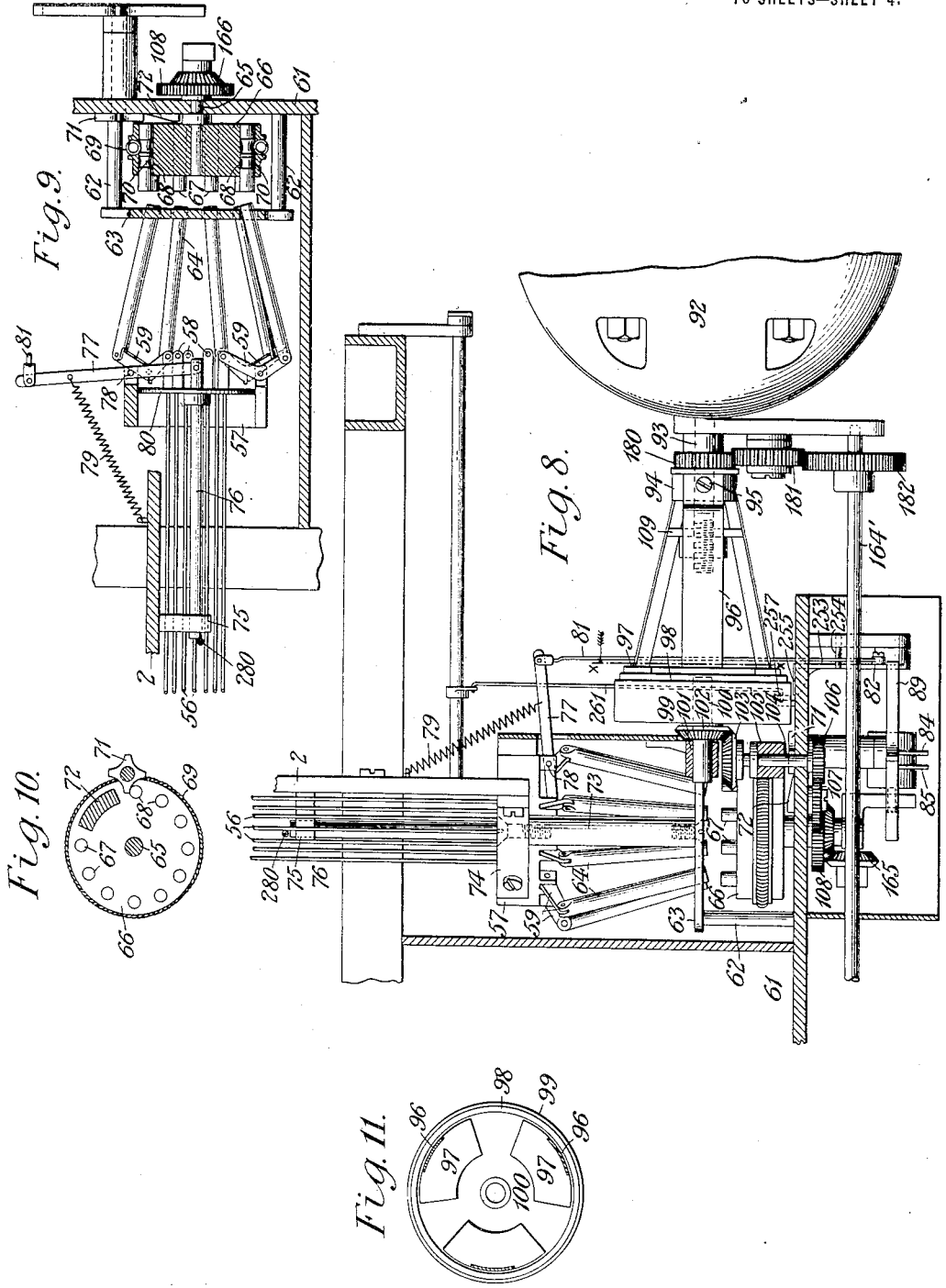

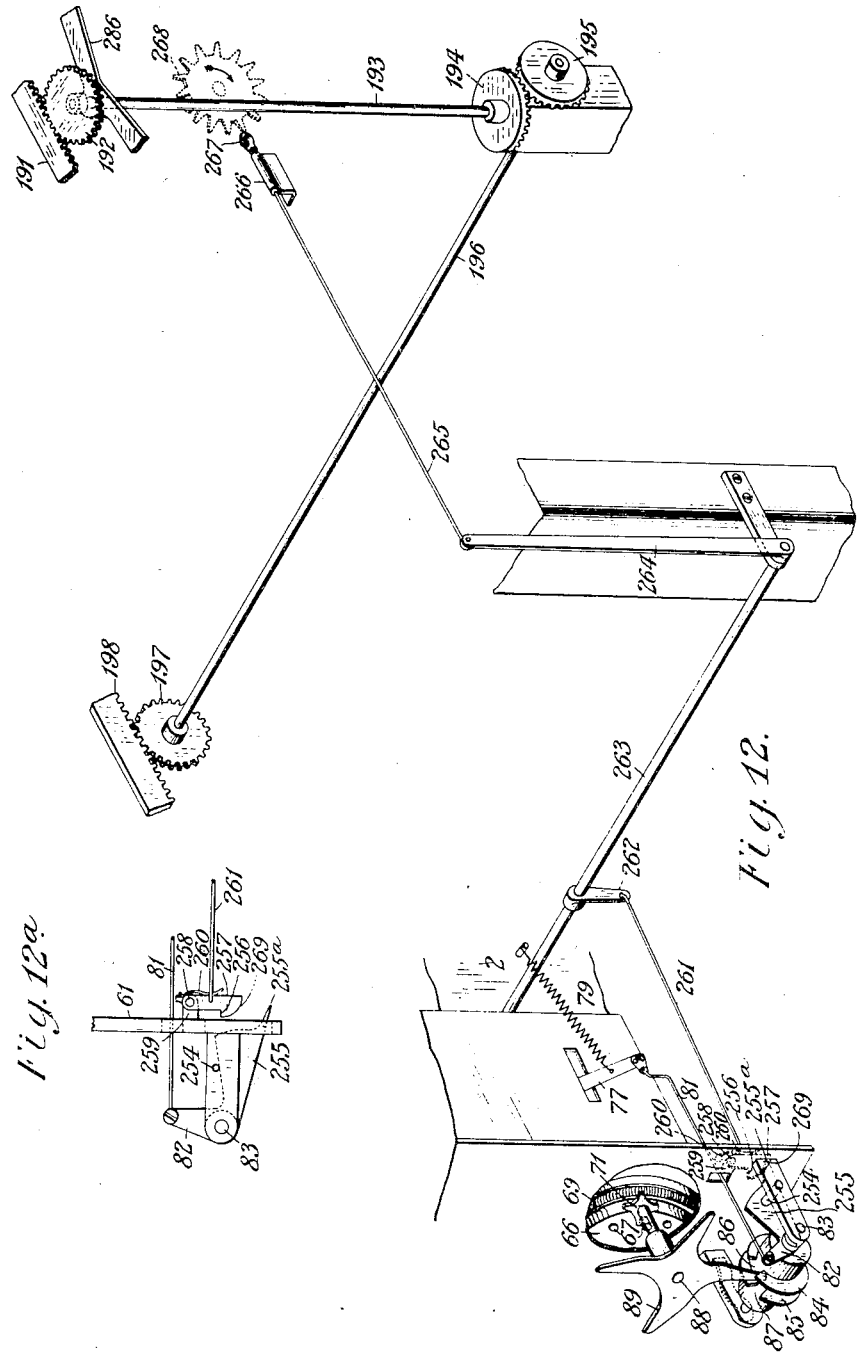

W. WRIGHT.
COMBINED TYPE WRITING AND COMPUTING MACHINE.
APPLICATION FILED MAY 12, 1910.
1,287,559.
Patented Dec. 10, 1918.
10 SHEETS—SHEET 6.
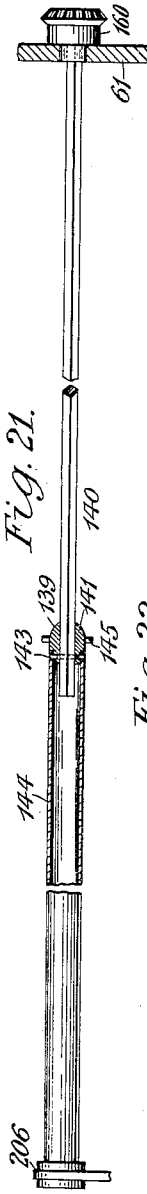
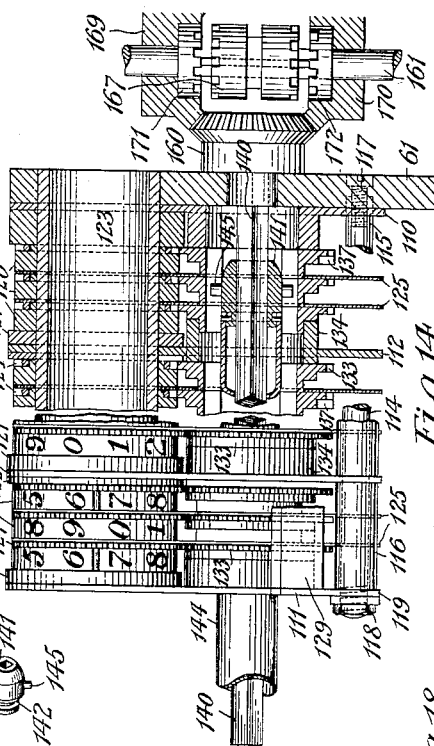
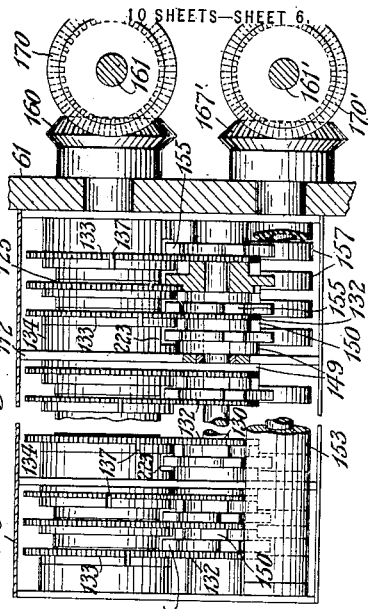
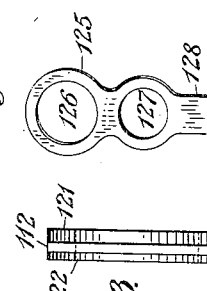
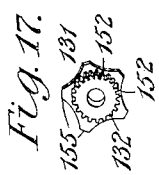
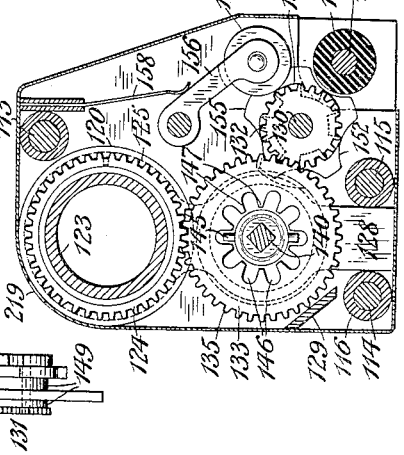
Witnesses:
John A. Rennie
Sigmund Schiff
Inventor:
Walter Wright
By B. C. Stickney
his Attorney.

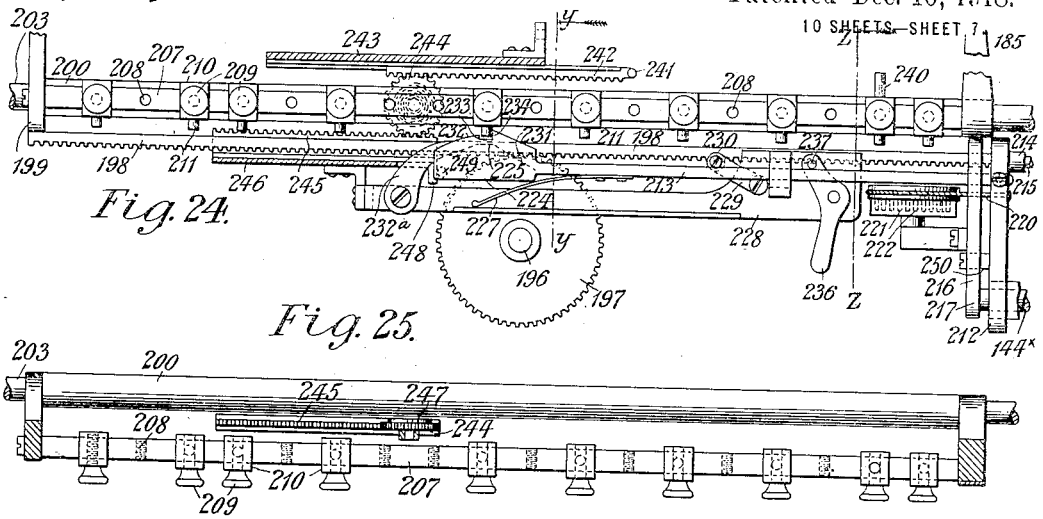
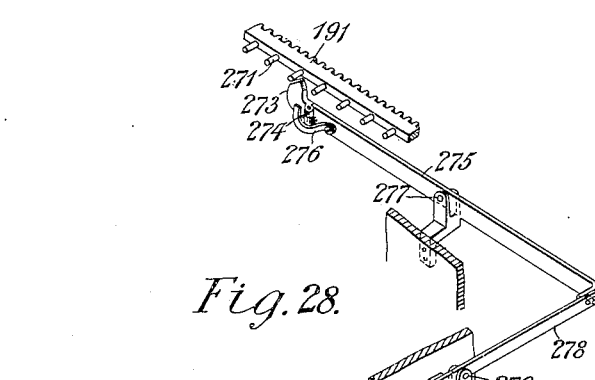
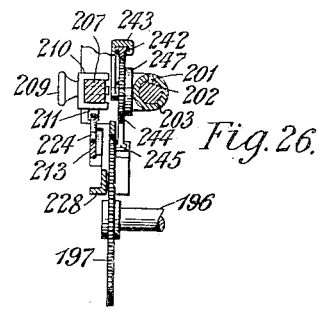
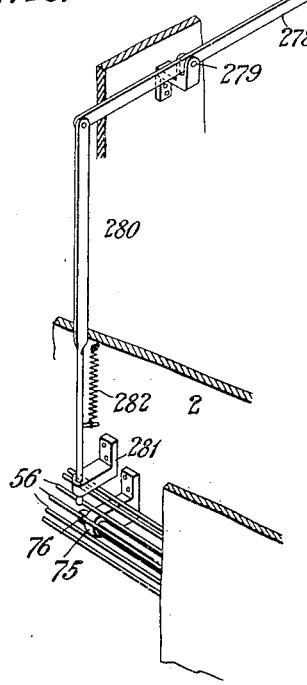
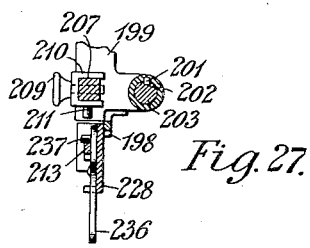

W. WRIGHT.
COMBINED TYPE WRITING AND COMPUTING MACHINE.
APPLICATION FILED MAY 12, 1910.
1,287,559.
Patented Dec. 10, 1918.
10 SHEETS—SHEET 8.
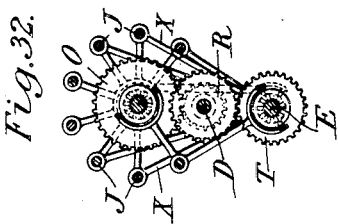
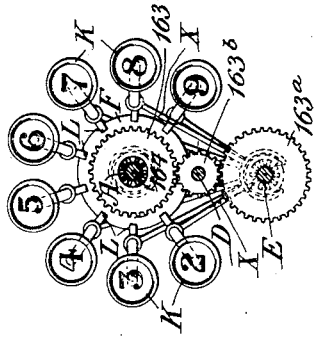
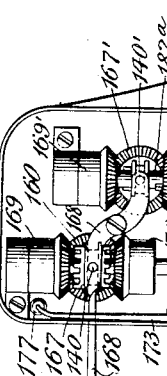
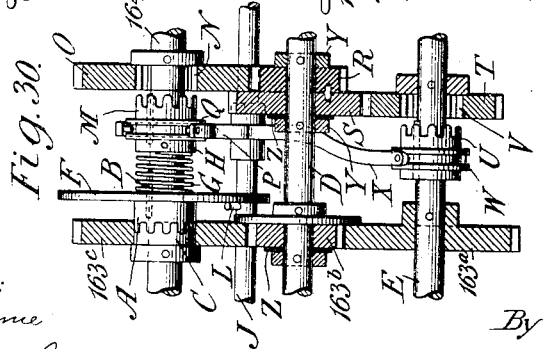
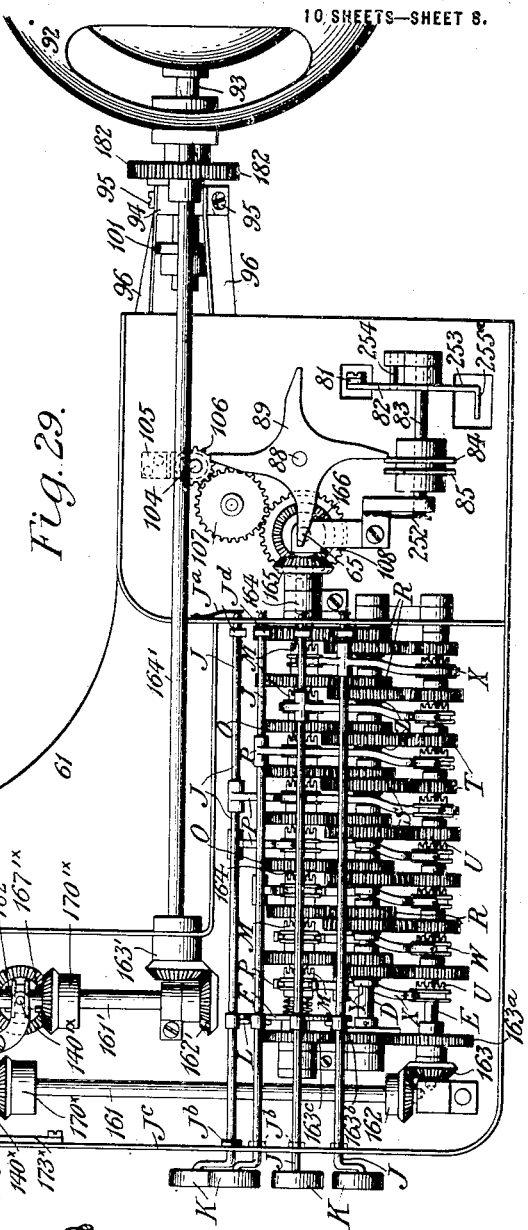
Witnesses:
John A. Rennie
Sigmund Schiff
Inventor:
Walter Wright
By B. B. Stickney
his Attorney.

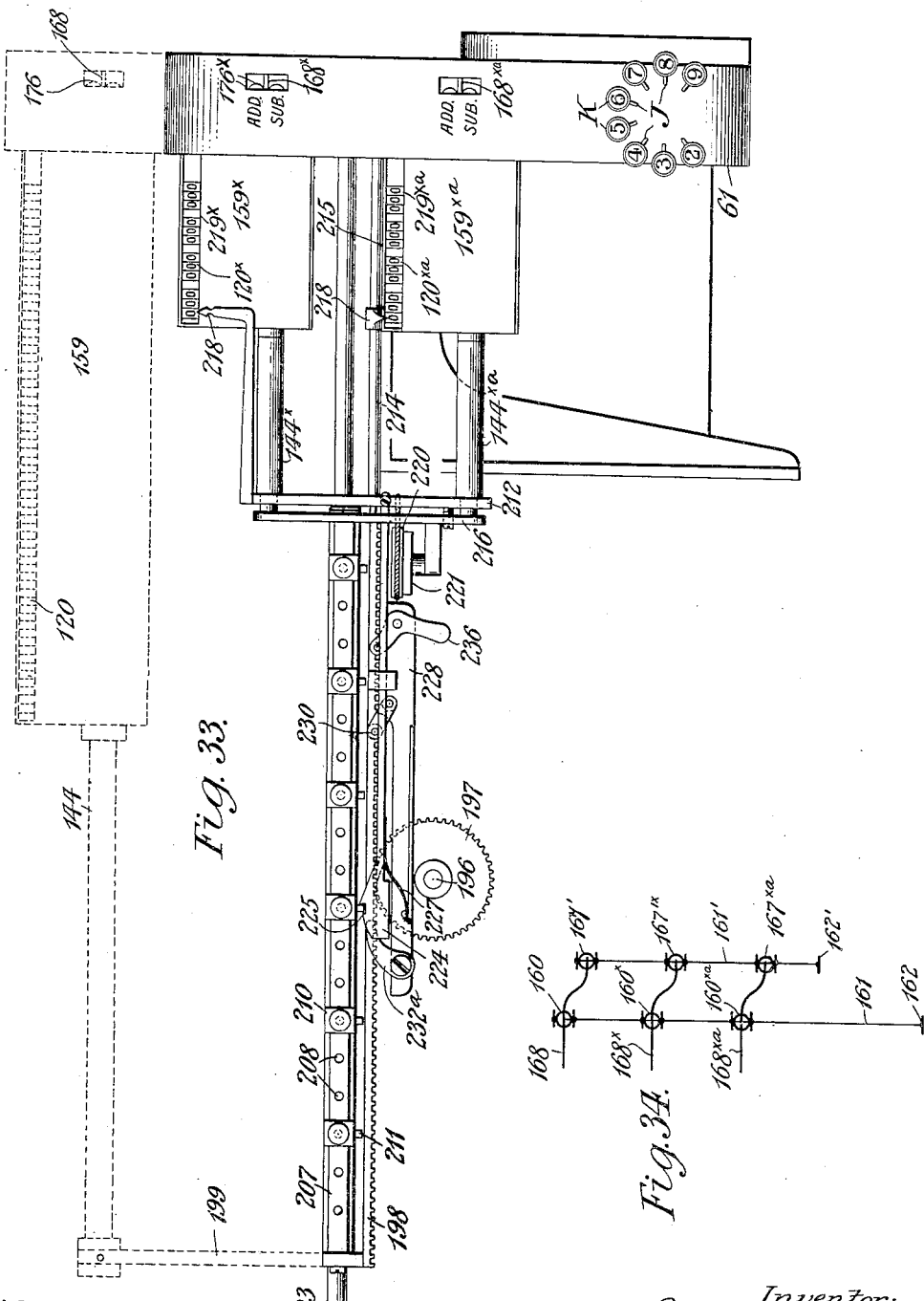

W. WRIGHT.
COMBINED TYPE WRITING AND COMPUTING MACHINE.
APPLICATION FILED MAY 12, 1910.
1,287,559.
Patented Dec. 10, 1918.
10 SHEETS—SHEET 10.
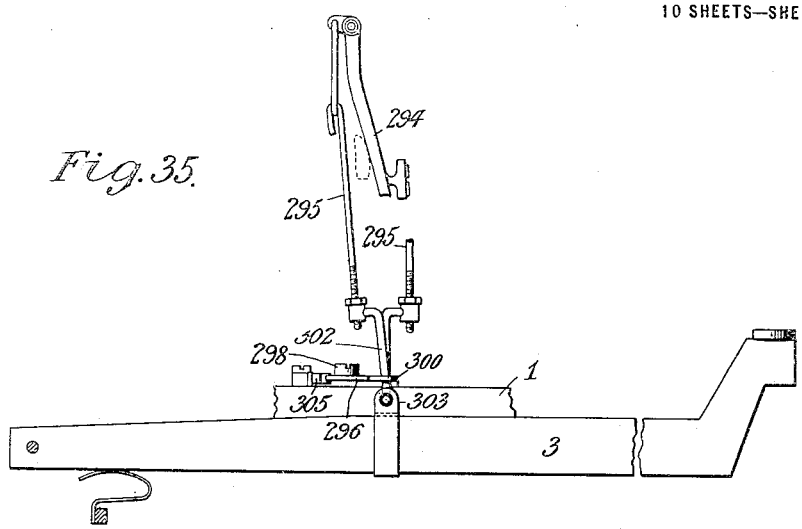
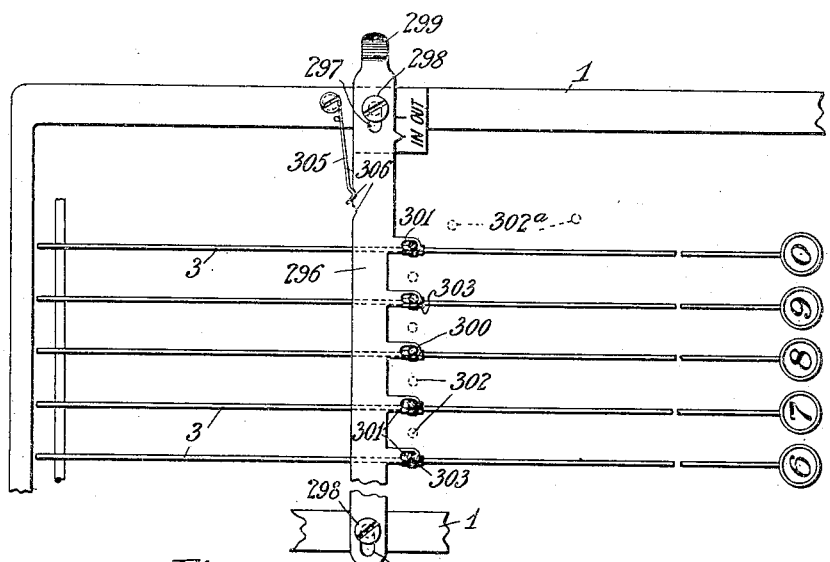
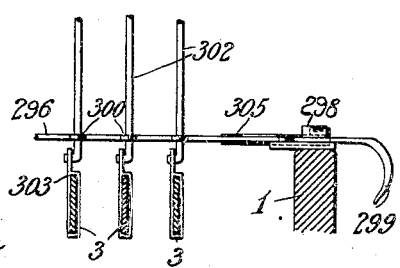
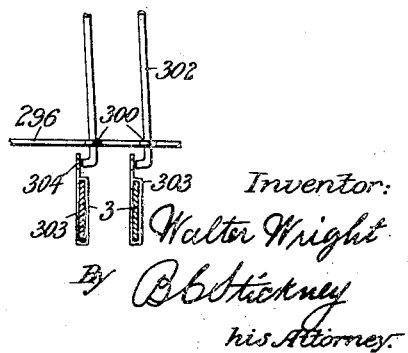

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,287,559.     Specification of Letters Patent.     Patented Dec. 10, 1918.

Application filed May 12, 1910. Serial No. 560,927.

*To all whom it may concern:*

Be it known that I, WALTER WRIGHT, a citizen of the United States, residing in New York, in the county of New York and State of New York, have invented certain new and useful Improvements in Combined Type-Writing and Computing Machines, of which the following is a specification.

This invention relates to computing machines, particularly to combined typewriting and computing mechanism.

The principal object of the invention is to provide simple, compact, inexpensive, easily operated and reliable means for multiplication. The invention is shown in connection with computing wheels which are power-driven, the extent of rotation of the computing wheels being determined by a set of keys, preferably the figure keys of a typewriting machine.

These keys operate a variable escapement mechanism, which controls the extent of rotation of the computing wheels under the influence of the motor or other source of power.

According to the present invention, there is introduced, between the escapement wheel of the computing mechanism and the master-wheel (which engages said computing wheels individually) a system of gears, which is analogous to a back-gearing, whereby the master-wheel may be caused to rotate automatically either two, three, four, five, six, seven, eight or nine times as far as in the case of simple addition, so that the computing wheels are turned to a corresponding extent. This back-gearing is controlled by a special set of keys; and of these, any one, representing the multiplier may be held depressed while the numeral keys of the typewriter are being manipulated to write the multiplicand. The machine is normally in position to add, or in other words, to multiply by one, such number as is written by means of the typewriter keys. Each multiplier key disconnects the master-wheel from the escapement wheel aforesaid, and re-connects said two members to a different set of gearing, according to the multiplier key which is depressed.

A further object of the invention is to divide; and to this end there is provided means for reversing the direction of the master-wheel to cause the machine to subtract. The manner of operation will be explained fully hereinafter; a succession of subtractions enabling the operator to determine the quotient.

Preferably, two or more computing heads are provided, upon one of which individual multiplications or divisions may be performed, while the products of such calculations may be accumulated upon one or more of the remaining computing heads. Said remaining computing heads may comprise a main computing head, such as illustrated in my former applications, and a cross-adder, that is, one that computes a part of a series of numbers extending in a single line across the page.

Other features and advantages will hereinafter appear.

This invention embodies the features disclosed in my pending application No. 490,109, filed April 15, 1909; and it also shows certain features that are disclosed in my pending application No. 485,046, filed March 22, 1909.

Figure 2:
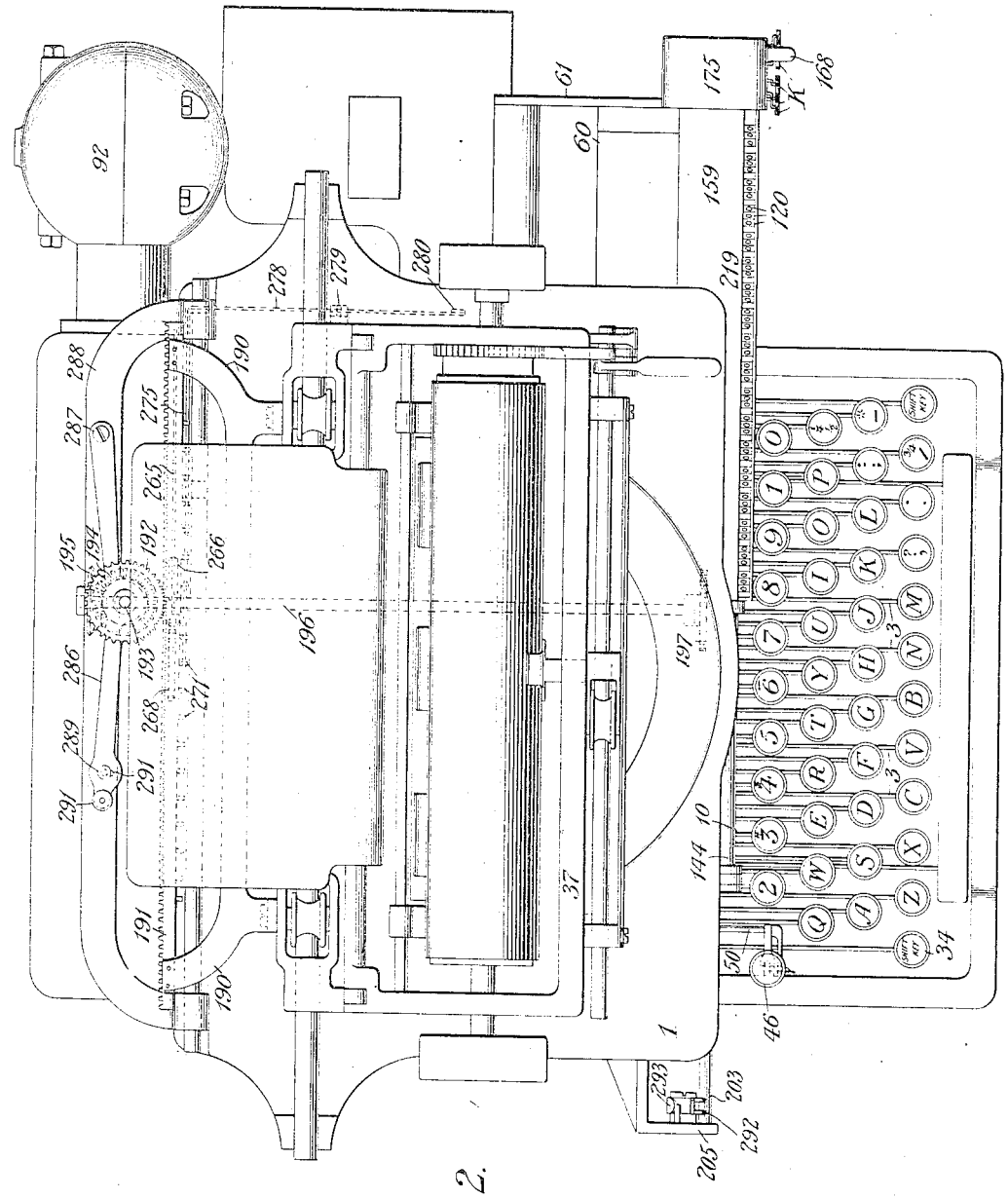

In the accompanying drawings, Figure 1 is a front view of the machine; Fig. 2 is a top plan view thereof; Figs. 3, 4, 5 and 6 are broken enlarged detail front views of the mechanism, in various positions, for connecting the numeral keys with the computing mechanism and for disconnecting them therefrom; Fig. 7 is a broken vertical transverse section of the front portion of the machine, particularly showing the parts illustrated in Figs. 3 to 6; Fig. 8 is a broken plan view of the computing controller; Fig. 9 is a sectional view of the same, showing the parts in a different position; Fig. 10 is a cross section taken in front of the controller; Fig. 11 is a cross section on the line $x$—$x$ of Fig. 8; Fig. 12 is a perspective view showing the safety connections between the controller and the typewriter escapement; Fig. 12$^a$ is a side view of part of said connections; Fig. 13 is a front view, partly in section through a portion of the computing mechanism; Fig. 14 is a bottom plan view of the same, partly broken away; Fig. 15 is a transverse vertical section of the same; Fig. 16 is a perspective view, on a reduced scale, of one of the washers; Fig. 17 is a perspective view of one of the transfer wheels;

Fig. 18 is a similar view of the same on the opposite side to that of Fig. 17; Fig. 19 is a perspective view of one of the computing wheels; Fig. 20 is a view, similar to Fig. 17, of one of the transfer wheels which extends through a partition; Fig. 21 is a broken plan view, partly in section, of the actuator shaft and the tube moving with the actuator; Fig. 22 is a perspective view of the actuator; Fig. 23 is a detail front view showing a partition and parts connected therewith; Fig. 24 is an enlarged detail front view of connections between two computing mechanisms; Fig. 25 is a plan view of the column stop bar; Fig. 26 is a cross section on the line y—y of Fig. 24; Fig. 27 is a similar view on the line z—z of Fig. 24; Fig. 28 is a detail perspective view, showing the mechanism for locking at each fourth writing space; Fig. 29 is a side elevation of one end of the machine, with a wall of the casing removed, and disclosing the system of back-gearing between the escapement wheel of the computing mechanism, and the vertical rotary shafts which connect to the computing heads; Fig. 30 is a sectional elevation on a larger scale of the gears at the left-hand end of the system of gearing seen at Fig. 29, showing the parts normally connected for adding, and also the clutch for disconnecting the parts so that other sets of gears may be caused to intervene between the escapement wheel and the master wheel; Fig. 31 is a front elevation showing the multiplier keys which control the gears seen at Fig. 29, and also showing certain of said gears; Fig. 32 is a sectional elevation taken through the system of gearing seen at Fig. 29, and showing one set in the system of back gears: Fig. 33 is a front elevation showing diagrammatically the main computing head (such as seen at Fig. 1) and two supplemental computing heads; Fig. 34 is a diagram to illustrate the connections whereby the three computing heads at Fig. 33 may be operated for either addition, subtraction, multiplication or division; the parts seen at said diagram corresponding to those seen at the left-hand part of Fig. 29; Fig. 35 is a diagrammatic side elevation of the type-action of a Remington under-strike typewriter, such as illustrated in Fig. 1, showing a method of disconnecting the types from the keys, so that computation may be effected without writing; Fig. 36 is a plan of the same, showing the types connected to the keys; Fig. 37 is a sectional front elevation of the devices, in the same positions as at Fig. 36; Fig. 38 is a view similar to Fig. 37, but showing the types disconnected from the keys.

*General use.*—The drawings show the invention as applied to a "Remington" typewriter, but it is to be understood that, with suitable changes, it may be applied to a typewriter of any standard construction, and also that the invention may be embodied in the form of a computing machine, or a computing and printing machine, complete in itself, and not attached to a typewriting machine.

*Key connection control.*—Secured to the frame 1 of the typewriting machine is a vertical plate 2 extending longitudinally of the machine over the key levers 3, (Figs. 1, and 3 to 7); and, secured upon the front side of said plate 2, are guides 4 for a slide bar 5. Through holes in said slide bar pass the stems 6 of hooks 7, said hooks being adapted to enter eyes 8 in loops 9 secured around the numeral key levers 10. Said hook stems, in the manner to be presently described, constitute the means for controlling the operation of the computing mechanism. It is sufficient for the present to observe that, when said hooks are in engagement with said eyes, said means are in operative position, so that through the depression of the numeral keys the computing mechanism is actuated, but, when the slide bar is moved to the right, so that the hooks are disengaged from said eyes, the computing mechanism is disconnected from the numeral keys. To move said bar longitudinally, there is secured upon said bar near the left hand end thereof a socket piece 11, into which extends a pin 12 secured upon the lower arm of a lever 13, pivoted at 14 on the plate 2, the upper end of said lever being connected by a link 15 with the lower end of a switch lever 16 pivoted at 17 on said plate 2. Stop pins 18 on the plate 2 limit the rocking movement of the lever 16. Also pivoted at 19 upon said plate is a hand lever 20 connected with a link 21, which, at its other end, is connected to a pin 22 secured in the upper end of a lower arm 23 pivoted upon the lower end of a switch lever 16, said pin also entering a slot 24 in an upper arm 25, secured to a short rock shaft 26, which extends through a sleeve 27 in the top of the lever 16 and carries upon its rear end an arm 28 (Fig. 7), to the outer end of which is connected a collar 29 which slides upon a rod 30 connected to a bracket 31 pivoted upon the rear side of the plate 2. Between said bracket 31 and said collar 29 is interposed a spring 32 coiled around said rod.

*Shift key control.*—In the Remington machine, as is well known, each type bar carries two types, of which one prints normally and the other only when the shift key is depressed. All of the nine digits are arranged in the typewriting machine to correspond to what are known as the "lower case" characters of the top row of keys 33, so that they may be printed by said keys without using the shift key. Since some other character than a numeral is also carried on each numeral type bar, therefore, if the shift key is used, and a numeral key operated, said other character is then printed. It is therefore desirable at that time to operatively disconnect the computing mechanism from the numeral keys. In the drawings, (see Figs. 1, 2 and 7), 34 indicates the typewriter shift key, which is connected in the usual manner by a link 35 to a bell crank lever 36, serving to shift the platen 37 in the usual manner. To said bell crank lever 36 is rigidly attached an arm 38, which is connected at 39 to a siphon-shaped depressor 40, of which the rear and longer leg 41 slides in a guide 42 secured upon the rear of the plate 2, while the short front leg 43 is adapted to depress the pin 22, when said pin has been moved to its extreme right hand position.

The following is the operation: In the normal position of the typewriter, in which it is not desired to use the computing mechanism, the parts are in the position shown in Fig. 3. It will be seen that in this position the slide bar 5 has been moved to the right, and consequently the hooks 7 are disengaged from the eyes 8 and the computing mechanism is disconnected. It will also be seen, upon comparing Figs. 3 and 6, that, if the shift key 34 be operated, the short leg 43, when depressed, will not impinge upon the pin 22 or any part of the mechanism, so that the printing mechanism is free to be actuated in precisely the same manner as if the computing mechanism were not attached thereto. When it is desired to bring the computing mechanism into continued use, the hand lever 20 is raised, which has the effect of moving the link 21 to the right, and swinging the lower and upper arms 23, 25 to the right into the position shown in Fig. 5. Consequently the rod 30 also moves to the right, and, when it does so, the rear arm 28, in rocking from its position on the left of the pivot 17 to its position on the right thereof, depresses the upper end of the coiled spring 32, producing an upward pressure by said spring against the collar 29. This upward pressure against said collar 29 produces an upward pressure against the rock shaft 26, and therefore tends to turn the switch lever 16 to the left upon its pivot. The turning of the lever upon its pivot correspondingly turns the lever 13, which moves the slide bar 5 to the left, into the position shown in Fig. 5. The numeral keys are thereby all connected with the computing mechanism which is now adapted for continous use.

As is well known, in the Remington and other shift key machines, in which the numeral keys are used for printing other characters besides numerals, it is while the shift key is held depressed that the striking of a numeral key causes the other character to be printed. It is necessary that the computing mechanism be rendered incapable of operation while such other character is being printed, and therefore while the shift key is thus held depressed; and it is desirable, for convenience and rapidity of operation, that this disconnection should be done automatically, and that the computing mechanism should be automatically connected again upon the release of the shift key. It will be seen that this result is accomplished by the mechanism above described, for, as shown in Figs. 6 and 7, upon the depression of the shift key, the short arm of the depressor 40 which is depressed by the depression of the shift key, has impinged upon the pin 22, and has thereby caused the switch lever 16 to swing upon its pivot 17, and move the slide bar 5 to the right, so as to disconnect the computing mechanism from the numeral keys. The parts are then in the position shown in Fig. 6, in which the pin 22 is on the right of the pivot 17, as are also the guide rod 30 and the coiled spring 32. Hence the spring 32 occupies the same position as when the computing mechanism is connected, and, consequently, when the shift key returns to normal position, and carries with it the depressor 40, raising the same from the pin 22, the spring 32 again acts to move the upper part of the lever 16 to the left, so as to move the slide bar 5 to the left and connect the computing mechanism with the numeral keys. In such a position, since the upper end of the lever 16 is on the right hand side of its pivot 17, and the spring 32 exerts an upward pressure against said upper end by means of the rear arm 28, the effect of the pressure of said spring, when the shift key is released, is to swing the lever 16 from the position shown in Fig. 6 to the position shown in Fig. 5.

*Temporary reverse.*—It may be desired to temporarily disconnect the computing mechanism from the numeral keys, as when it is desired to print numerals without effecting a computation. For instance, a figure may not have been printed plainly enough, and yet the computing mechanism has been already operated, so that a reprinting of said figure would have the effect of repeating the addition or subtraction. Or, on the other hand, it may be desirable in statistical work to print figures at different points of the writing line of the paper without computing, so that while the computing mechanism should be disconnected for the main portion of the line, but, at certain points on the paper, it might be desired to print figures and also make a computation. In this or other cases, where it is desired to print figures without effecting a computation, a temporary key 46 is used. The stem 47 of said key carries a pin 48 which engages an arm 49 extending from a rock shaft 50, which also carries a short arm 51 connected by a link 52 with the pin 22, which is carried by the end of the arm 23, so that the depression of said key 46 has the effect of drawing down the link 52. But, whether the parts be in the position shown in Fig. 3 or in that shown in Fig. 4, in either case a downward pull upon the pin 22 will have the same ultimate effect, for it swings the lever 16 upon its pivot 17, either from the position shown in Fig. 3 to that shown in Fig. 4, or from the position shown in Fig. 5 to that shown in Fig. 6, the effect in either case being to move the parts into the opposite position to that which they would otherwise occupy but for the depression of said key. This effect is continued so long as the temporary key is depressed. The result is that, if this temporary key should be depressed when the computing mechanism is operatively connected, as shown in Fig. 4, the effect would be to render the computing mechanism inoperative so long as the depression of the temporary key continues, as shown in Fig. 6, permitting figures to be printed without computation; or, if the temporary key should be depressed when the computing mechanism is disconnected, as shown in Fig. 3, the effect would be to temporarily connect the computing mechanism, as shown in Fig. 5, and to maintain it connected, so long as the temporary key is depressed, so that the printing of a figure will correspondingly effect a computation.

*Controller.*—The stems 6 are connected at their upper ends to bell crank levers 55 pivoted on the plate 2, (Fig. 8) the other arms of which are connected to rods 56, passing within a ring 57 secured to a bracket 74 connected to the plate 2, said rods being connected respectively to blocks 58 connected to levers 59 pivoted on said ring 57. Thus, upon depressing any one of the numeral keys, the outer end of the corresponding lever 59 is moved to the right. Secured on the right hand side of the frame of the typewriting machine is a bracket 60, (Fig. 1) supporting a vertical plate 61, carrying posts 62, supporting a guide plate 63, having a circular series of holes, through which extend the ends of nine pusher rods 64, pivotally attached to, the several bell crank levers. Said plate 63 is additionally supported by a strut 73 connected to the bracket 74 attached to the plate 2. Having its bearing in the plate 61 is a shaft 65 of a controller or primary escapement wheel 66, which, as will be presently described, is under constant rotational pressure. Stop bolts or escapement teeth 67, of which there should be not less than ten, slide in a circular series of slideways 68 in said controller which slideways register with the pusher rods 64, and said bolts project to the left of said controller normally, and until they are displaced by the action of the pusher rods 64. An annular coiled spring 69, which surrounds the controller in a groove therein deep enough to intersect the slideways for the bolts, and which is adapted to engage one or the other of two grooves 70 (Fig. 9) formed in each bolt, yieldingly maintains the bolts in the positions to which they have been moved. When any numeral key has been operated, and the corresponding pusher rod moved through the guide plate, its end impinges upon the end of one of the stop bolts projecting from the left hand side of the controller, and moves said stop bolt to the right, so that its other end then projects from the right hand side of the controller. The operation of a numeral key not only thus projects a bolt, but actuates an escapement, hereinafter described, for the controller, so that the controller is released and rotates. Its stoppage, after a certain extent of rotation, is effected by means of the then projected stop bolt impinging against a rotary stop wheel or pinion 71, (Figs. 8, 9, 10) and the extent of rotation depends upon its circumferential distance from the stop wheel, when it was so projected, and therefore upon the particular pusher rod and the particular key lever which were then operated. Upon the next operation of a numeral key and rotation of the controller, the stop bolt is, by means of a wedge 72 on the plate and located in the path of the projected stop bolt, returned to its normal position in which it projects from said controller to the left instead of to the right, and it is retained in that position by the annular coiled spring.

*Escapement.*—Secured upon the front side of said plate 2 is a guide way 75 for a stem 76, the other end of which is pivotally connected to a lever 77 pivoted at 78 upon the ring 57, to the other arm of which lever 77 is secured a spring 79, which normally tends to draw said arm to the left, and therefore said stem to the right. Said stem 76 carries a disk 80, and all of the rods 56 pass through holes in said disk.

When any numeral key has been operated, and thereby the corresponding rod 56 moved to the left, the block 58, by which it is connected to the bell crank lever 59, then abuts against said disk 80, and carries said disk with it to the left, thus rocking the lever 77. The long arm of said lever is connected at its extreme end by a link 81 with an arm 82 on an escapement controlling rock-shaft 83, so that, by said movement of said lever, said escapement shaft is rocked. Said escapement shaft carries two disks 84, 85, (Fig. 12) spaced apart a short distance, and having respectively formed in their beveled edge notches or recesses 86, 87, offset from each other. Through said plate 61 passes a shaft 88, which, on the left side of plate 61, carries the before-mentioned stop wheel or pinion 71, which is star-shaped, having points any of which is adapted to lie in the path of a bolt in the controller which has been projected to the right, and arrest said controller if said stop shaft is at that time itself held fast and non-rotatable. Secured upon the end of said stop shaft, upon the right hand side of the plate 61, is a secondary escapement wheel 89, having the same number of points as the wheel 71, a point of which escapement wheel normally abuts against the first or rear disk or dog 84. Therefore, when any numeral key has been actuated, and thereby the escapement shaft 83 rocked, the disk 84 is thereby moved until the notch 86 therein comes opposite to the point of the escapement wheel 89, which can then immediately pass through said notch. This it immediately does, because, as already mentioned, the controller shaft is under constant rotational pressure, so that the previously projected bolt is pressing against a point of the rotary stop wheel 71. After said point has passed through said notch 86, it then abuts against the second disk 85, and the stop shaft is again held from further rotation. The slight movement thus given to the stop wheel 71 allows the bolt or tooth 67 arrested thereby to move only a very short distance. Then, upon the release of the numeral key, the escapement shaft 83 returns to its original position, in which position the notch 87 in the second disk 85 now comes opposite to the said beveled point or arm of the escapement wheel 89, which thereupon escapes therethrough, under the pressure of the projected stop bolt against an arm of the rotary stop wheel 71. This pressure rotates the shaft 88 so that the next succeeding arm of the rotary stop wheel is brought into the path of the last projected bolt, which then impinges against said latter arm, thus again producing rotational pressure on the stop shaft, rotating said shaft until the next succeeding point of the escapement wheel 89 is brought up again at the first escapement disk 84, and the parts are then again in their normal position, ready for another operation. It will thus be seen that the extent of movement of the controller shaft is dependent upon the angular position, relatively to the rotary stop wheel 71, of the pusher rod actuated, and therefore upon the particular numeral key which is operated.

*Driving.*—It has been already mentioned that the controller shaft 65 is under constant rotational pressure, tending to rotate said shaft whenever released by the escapement. This rotation is derived from any suitable motor, an electric motor 92 being shown herein. The shaft 93 of said motor has secured thereon a head 94 to which are secured by screws 95, the ends of three spring arms 96 (Figs. 8, 29). To the other ends of said arms are secured arcuate shoes 97, which bear against a fiber lining 98 of a cup-shaped head 99 secured upon a shaft 100 having a bearing in a bracket 101 secured to the plate 61.

Said shaft 100 has secured thereon a bevel gear 102, which meshes with a bevel gear 103 on a shaft 104 rotating in a bracket 105 secured to the inner side of the plate 61, as shown in dotted lines in Fig. 29, and carries on its outer end a gear wheel 106 which meshes with an idle wheel 107, which in turn meshes with a gear wheel 108 upon the controller shaft 65. It is by this means that the controller shaft is given a constant rotational pressure always in the same direction, rotating the shaft whenever it is released.

In order to vary the amount of friction transmitted from the rotating shaft, the outer end of the motor shaft 93 is threaded, and upon said threaded end is screwed a flanged sleeve 109 which is adapted to bear against the spring arms 96. By screwing said sleeve in or out, the pressure upon said spring arms, and therefor the pressure of the shoes 97 against the lining 98 of the head, is increased or diminished as desired.

*Computing mechanism.*—The frame of the computing mechanism comprises end plates 110, 111, and a series of transverse partitions 112. These partitions are connected by an upper bar 113 and two lower bars 114, 115, and are spaced from each other by sleeves 116, around the bars. Said bars at one end, after passing through the end plate 110 into the plate 61, are secured by means of screws 117 (Fig. 13). Upon the other ends of said bars where they pass through the end plate 111, are screwed nuts 118, washers 119 being interposed between said nuts and the end plate 111.

Each sleeve 116 is of such length that said sleeve and a partition occupy a longitudinal distance equal to that of four typewriting spaces. Between two adjacent partitions are interposed three register wheels 120, each of the width of one typewriting space, and two spring washers 121, 122, next to the respective partitions, which washers and a partition together occupy a distance equal to one typewriting space. Said register wheels 120 are in the form of rings supported upon a hollow shaft 123 of comparatively large diameter, supported by the partitions and end plates. Each register wheel has formed on one side thereof a thin gear wheel 124, by means of which it is rotated in the manner to be presently described. On each side of the middle register wheel is a thin washer 125, shown in detail in Fig. 16, having an upper circular opening 126 which surrounds the hollow shaft 123, thereby supporting the washer on said shaft, having also a lower circular hole 127 and a foot 128 contained between the sleeves 116.

In oblique slots in the front edges of partitions and end plates is a shelf 129. Also extending through all the partitions is a carrying wheel shaft 130, having thereon a series of carrying wheels 131, each formed with gear teeth 132. Supported on one side by said gear teeth 132 and on the other side by the shelf 129, (Fig. 15), are a series of computing wheels 133, each computing wheel being of a thickness equal to one typewriting space. Secured in the partitions are short spacing cylinders 134 of a thickness equal to one typewriting space, and co-axial with the computing wheels.

Each computing wheel 133, shown in detail in Fig. 19, is formed on one side with gear teeth 135, adapted to mesh with the gear teeth 124 of the corresponding register wheel, and is also formed, next to said gear teeth 135, with an annular shoulder 136, upon which is a single carrying tooth 137 forming a lateral extension of one of the gear teeth 135. Each computing wheel 133 is also formed with a reduced hub portion 138, (Fig. 13) which, of the left hand one of the computing wheels of a group of three, rotates within the spacing cylinder 134 contained within and secured to the partition on its left.

Through said computing wheels passes a longitudinal computing shaft 140, rotated in a manner to be presently described, and upon which shaft can slide a sleeve 141. The shaft 140 is preferably square, and the sleeve has a corresponding square opening fitting snugly on the shaft, so that said sleeve always rotates with the shaft. Said sleeve (Fig. 22) at its advancing end 139 is rounded or tapering, and at the rear end is formed with an annular groove 142, and in said groove are pins 143 projecting inwardly from the end of a non-rotatable tube 144 which can telescope around said square shaft out of contact therewith. Said sleeve 141 is formed with actuating pins 145 which are adapted to engage one or the other of ten recesses 146 formed by internal gear teeth 147 within the computing wheels. As will be presently described, the tube 144, and therefore also the sleeve 141, travel within the said computing wheels through a distance of one typewriting space with each step movement of the typewriter carriage, and in the positions of rest is either at the middle of a computing wheel or at the middle of a spacing cylinder 134 between two groups of computing wheels. By the rotary movement of the square shaft, to be presently described, the actuating pins 145 are always rotated through an exact multiple of one tenth of a revolution, so that, after making a rotation within any computing wheel and thereby causing the computing wheel to rotate with them they are in position on the next advance to be moved longitudinally and exactly mesh with some one pair of opposite recesses of the next computing wheel. The rotation thus imparted to the computing wheel causes the register wheel to rotate through a corresponding angular distance.

*Transfer mechanism.*—Each time that the computing wheel makes a complete revolution, the single carrying tooth 137 formed thereon engages one of five lugs 150 of a carrying wheel 131 loose upon said shaft 130, the gear teeth 132 of which mesh with the external gear teeth 135 on the right hand side of the next computing wheel 133 on the left, and said wheel 133 on the left is thereby partly rotated through one-tenth of a revolution. Said carrying wheel is also formed with a disk-like portion 151 having five concavities 152 each in an arc of a circle of slightly greater diameter than that of a transfer cylinder 153, preferably of rubber or other resilient material, secured to a shaft 154 and rotated herewith, which shaft, as hereinafter described, constantly rotates. Said shaft 184 is supported in bearings at suitable intervals in the partitions and end plates, or if desired, may be journaled only at the ends. When, by the advance of the single carrying tooth 137 in the manner just explained, the carrying wheel has been moved through an angular distance corresponding to a part of one-tenth of the revolution of the computing wheel, it is then in such a position that one of its projecting portions 155, between two adjacent concavities 152, has been forced into sufficiently close contact with the constantly rotating transfer cylinder 153, and is rotated with the latter until its next concave side 152, in turn, assumes a position over the rubber body 153 of the transfer shaft 154.

The hub of each third carrying wheel is of a sufficient length, as shown at 148 in Fig. 20, to extend through a partition being permanently supported therein to carry from the computing wheel on the right hand side of the partition to the next computing wheel on the left thereof (see Fig. 14). Suitable spacing washers 149 are provided to maintain such carrying wheel in its proper relation to the other wheels. The spacing cylinders 134 are cut away, as shown at 223 to permit the carrying wheels 131 opposite thereto to freely rotate.

In order to aline the figures on the register wheels, and to insure that the carrying wheels 131 are not unduly rotated, there is provided, for each such carrying wheel, a pivoted arm 156 carrying a roller 157 which is pressed by a spring 158 into one of the concave sides 152 of said carrying wheel. It will thus be seen that each computing wheel cannot be advanced by the transfer mechanism more than one-tenth of a revolution, first, because of the roller 157, and second, because of the form in the peripheries of the carrying wheels, the points of which cannot take hold of the rubber body of the transfer shaft and rotate with it, unless positively forced thereinto. It will be seen that all of the computing devices contained in the main computing mechanism are operatively connected throughout the entire series, so that the whole series can be used for a single column or for a variable number of independent columns.

The entire mechanism is covered by a casing 159 having a slot 219 through which a line of figures on the register wheels is exposed to view.

*Independent denominational computation.*—The above construction and arrangement of computing wheels, carrying wheels, and transfer shaft constitute what is believed to be a novel form of computing mechanism for machines, such as adding machines, in which a rotary impulse is imparted directly to a series of devices in succession, corresponding to the several denominational values of the computing machine.

Each computing wheel is positively geared with its carrying wheel on the right, that is, the carrying wheel which connects it with the next computing wheel on the right, but its only connection with its carrying wheel on the left, which carries to the next computing wheel on the left, is through its carrying tooth. Therefore, each time that a computing wheel is rotated, its carrying wheel on the right, geared thereto, will also be rotated, but the latter wheel will not rotate the next computing wheel on the right, even though said next computing wheel on the right be standing with its carrying tooth at the position corresponding to the display of the figure "9" in addition, or "0" in subtraction. For, when a computing wheel stands in this position, the five lugs 150 on the carrying wheel on the left can freely rotate without coming in contact with the carrying tooth 137. Consequently, there is no rotation transmitted from a computing wheel on the left to a computing wheel on the right through the carrying wheel.

Since, however, the carrying tooth 137 of a computing wheel, when either at "9", or at "0", is in such a position that the five lugs 150 on the carrying wheel do not engage the same when said carrying wheel rotates in either direction, it is evident that said computing wheel has considerable lost motion, in moving from "9" to "0" or "0" to "9", before it can be brought into operative engagement with the five lugs 150 of the carrying wheel to the left, and it would therefore be impracticable to transmit, through said carrying wheel, to the computing wheel on the left, an amount of rotation, namely, one-tenth of a revolution, equal to that transmitted to said carrying wheel from the computing wheel operated, since the first part of this rotation is made without producing any motion of the said carrying wheel. Now, although the latter part of the motion of one-tenth of a revolution of the computing wheel, after it comes in through operative engagement with the carrying wheel on the left, is effective in imparting only a partial rotation to said carrying wheel, yet this is sufficient, for it is sufficient, to cause a projection 155 of the carrying wheel to engage the rubber cylinder 153 of the transfer shaft, and since the latter is in constant rotation, the transfer shaft completes the work which was omitted by the computing wheel in the first part of its rotation, and moves the carrying wheel through the remainder of the necessary rotation to rotate the computing wheel on the left through one-tenth of a revolution.

Thus the computing wheel stands in such a position, when at "9" or "0", that the carrying wheel on the left can be freely rotated in either direction, and, because this arrangement necessarily requires lost motion of the computing wheel on the right, I compensate for this lost motion by providing extraneous means for rotating the carrying wheel through the latter part of its movement. This carrying wheel rotating means may however be used with many other kinds of tens-carrying mechanisms, particularly where it is desired to take up lost motion.

*Duplicate computation.*—The machine as shown provides for two independent computing mechanisms, the secondary computing mechanisms and its operating means being hereinafter more fully described. Such parts thereof as it is necessary to refer to will be designated by the affix "×" affixed to the numeral of the corresponding part of the main mechanism.

*Addition and subtraction.*—The computing shafts 140, 140$^×$, have respectively secured upon the ends projecting through the plate 61 bevel gears 160, 160$^×$, which are adapted to be driven by a vertical shaft 161, having at the lower end a bevel gear 162 meshing with a bevel gear 163 fixed to a gear 163$^a$, which meshes with an idle pinion 163$^b$, the latter meshing with a gear 163$^c$ mounted upon a horizontal shaft 164 having a bevel gear 165 driven by a bevel gear 166 upon the controller shaft 65. When said controller shaft has been released by the depression of a numeral key and rotates through an angular distance corresponding to the numeral key depressed, said rotation is transmitted to the vertical shaft 161 and thence to the shafts 140, 140$^×$, selectively, in one or the other direction by means of sliding clutches 167, 167ˣ, slidable upon said vertical shaft 161 but rotating therewith. By means of a lever 168 the clutch 167 is adapted to be brought into operative engagement with either of two bevel gears 169, 170, loose on the shaft and always in engagement with the bevel gear 160. If said lever 168 is moved upward, then the clutch 167 is moved into engagement with a clutch member 171 formed within the upper bevel gear 169, thereby rotating the computing shaft 140 in the direction proper for addition. If said lever is moved downward, the clutch 167 engages the clutch member 172 of the lower bevel gear 170 and rotates the shaft 140 oppositely to its former direction, causing the computing wheels to subtract. If said lever is moved to a mediate position, the clutch 167 is out of engagement, and the computing shaft 140 does not rotate. In order to retain the lever 168 in any position to which it has been moved, there is provided a pivoted bar 173, secured to the front wall 174 of a casing 175 around the end gearing, said bar having three notches 176 adapted to selectively receive the edge of the lever 168, and the bar being pressed against said lever by a spring 177.

167ˣ, 168ˣ, 169ˣ, 173ˣ, indicate parts for the secondary mechanism corresponding to the parts 167, 168, 169, 173, of the main mechanism.

The transfer shaft 154 has a constant rotary movement which is derived from the electric motor 92 by means of a gear wheel 180 on the shaft 93 of the motor, meshing with an idle gear wheel 181, which in turn meshes with a gear wheel 182, on a shaft 164′; carrying a bevel gear 163′ which meshes with a bevel gear 162′ on a vertical shaft 161′, with which coöperate parts similar in their general construction and arrangement to those immediately coöperating with the vertical shaft 161, except as to the form of the clutch sleeve 167′, which, in this case, has only a pair of teeth 182ᵃ instead of a number thereof, on each side, the reason being that said shaft 161′ revolves constantly at a rapid speed, and when the direction of computation is changed, this must be done while said shaft 161′ is in motion, whereas the direction of motion of the computing shaft 140 is never changed except when the shaft 161 is at rest. By arranging that the clutches 167, 167′, for the computing shaft and for the transfer shaft are actuated by a common lever 168, it is insured that the transfer shaft will always be rotated in unison with the computing shaft.

*Multiplying devices.*—The horizontal shaft 164, which has hereinbefore been explained, is rotated upon the depression of any numeral key, and carries a clutch A, keyed or splined to the shaft at B, Fig. 30, to rotate therewith and slide thereon. This clutch or clutch-member A is normally in engagement with an internal clutch C, on the gear 163ᶜ, the latter loose on shaft 164. The gear 163ᶜ, as already explained, meshes with the idle pinion 163ᵇ, loosely mounted upon a fixed horizontal shaft D; and 163ᵇ meshes with gear 163ᵃ which is fast upon horizontal rotatable shaft E, (to which is fixed the bevel pinion 163). By this means the vertical shaft 161 is normally driven from the motor 92 for either adding or subtracting. To said clutch A is fixed a disk F. A compression spring G, coiled around the shaft 163, is confined between the disk F and a collar H secured upon the shaft 164, Fig. 30. Normally, the clutch A C is closed by said spring G, so that the machine may either add or subtract.

Whenever it is desired to multiply, the clutch A must be released from C, so as to break the described connection between the primary escapement wheel 66 and the master wheel 145, so that other connections may be substituted or rendered effective.

This disconnection of the clutch A C is effected through the disk F, around which are grouped horizontal rods J, carrying at their front projecting ends keys K; said rods or stems mounted to slide at their front and rear ends in vertical plates shown as forming parts of the framework; springs Jᵃ pressing these rods forwardly and stops Jᵇ on the rods being held against the vertical plate Jᶜ by said springs. These keys bear the characters from "2" to "9" inclusive, at Fig. 31, and are used in multiplying. To enable each of the keys to disconnect the gear A C, each key stem J carries an arm or finger L, engaging the front side of said disk F, so that when any key is pressed rearwardly, said disk and the clutch member A are pushed back against spring G, and the gear 163ᶜ is thereby released from the driving shaft 164.

Upon the shaft 164 are also provided eight other clutches or clutch members M, similar to A and similarly splined to the shaft 164, and each mounted to move independently of the others. These clutch members M are adapted to move into engagement with internal clutch members N, Fig. 30, formed in gears O loose on the shaft 164, and ranged at intervals therealong.

Each of the key stems J also carries an arm or finger P. These fingers P are arranged, however, at different points along the stems J, each of said stems being connected by its finger P to a certain one of the clutch members M, the latter having grooved collars Q to receive the fingers P. Thus, all of the keys K will disconnect the shaft 164 from the gear 163ᶜ, but each of said keys K connects a different one of the primary gears O to said shaft 164.

Each of said primary gears O meshes with a pinion R loose upon the fixed shaft D; each of the pinions R being fixed to a companion gear S, of different diameter from R, and each gear S in turn meshing with a pinion T upon the bottom shaft E, to turn the latter, and, through the bevel gear 163, to rotate the vertical shaft 161, and hence the master wheel 145 and the computing wheels. Thus, each key K causes a different set of back gears to control the shafts E and 161, so that a variable rotation of the master wheel 145 is caused, depending upon which key K is operated.

The wheels O, R, S and T, corresponding to the several clutches and key stems or pushrods already mentioned, have such relative diameters that the ratio of speed of the shaft E to that of the shaft 164 varies in proper relation to the particular key operated. This, upon operating the multiplying key K which bears the numeral "2", the speed of shaft E will be twice as great as its normal speed, (i. e., when used for ordinary addition or subtraction), or in other words, it will make twice as many revolutions and effect twice as many turns of the master wheel 145 and the computing wheels controlled thereby: so that twice as much will be added. Said key K bearing the number "2", if pushed as far as permitted by stop J$^d$ and held back during the depression of the numeral key bearing the number 7, for instance, will cause twice 7 or 14 to be added upon the adding wheels. If the key K bearing the number "3" is held back while the numeral key 7 is operated, three times 7 or 21 will be added upon the computing wheels, and so on; so that on pressing back the key K carrying the number "9", during the operation of numeral key 7, 9 times 7 or 63 will be added upon the numeral wheels 120. Corresponding results will be obtained of course, by operating any of the other numeral wheels: and consequently the distance through which the computing shaft of each of the primary or secondary computing mechanisms rotates upon the depression of any numeral key of the typewriter, will, when the multiplying key K bearing the number "9" is depressed, be 9 times as great as the distance through which it rotates upon the depression of said numeral key alone.

Upon the shaft E there are also provided clutch members U, splined to shaft E in the manner already described with reference to the clutch A, and movable along said shaft independently of one another, and constructed to engage internal clutches V provided in the pinions T, Fig. 30, but normally disengaged therefrom. Each of said clutches U has a collar W engaged by a finger X, said fingers X carried by the key stem J for a purpose similar to the finger P. so that when any clutch M is operated, the corresponding clutch U is similarly operated, so that when any main gear O is connected to the shaft 164, the gear T at the other end of the set of gears is simultaneously connected with shaft E; all the other sets of gears O, R, S, T, remaining stationary while any one set is active.

The pair of gears R, S, may be confined between collars Y fixed upon the stationary shaft D; and any suitable brake, as for instance a friction washer Z between the collar Y and the gear S, may be provided for holding each set of gears stationary when out of use.

In operation, supposing that it is desired to multiply 1234 by 5, the operator pushes the multiplier key K No. 5 and depresses typewriter numeral keys corresponding to the figures 1234, and the register wheel shows the product. Supposing it is required to multiply 1234 by 56, the operator first presses and holds back the multiplier key K No. 5, while he depresses successively the numeral keys for the figures 1234, then returns the carriage to the point or letter-space, (in the ordinary movement of the carriage) next following that at which the multiplication by 5 was commenced, presses and holds the multiplier key K No. 6, while he again depresses the numeral keys for the figures 1234.

In this operation, the number 1234 is written upon the paper while the key K bearing the number "5" is pressed back, and 61700 appears upon the numeral wheels 120, Fig. 1. The operator then runs the carriage back until the index 185 is opposite the number "1" where it appears on the computing wheels 120, and then holds back the key K numbered "6" while he again operates the numeral keys of the typewriter 1234; the types striking over the type impressions already made, or else in a new place on the work sheet, if desired. The machine will automatically add 7404 to the amount 61700 previously obtained, and the number 69104 will show upon the number wheels 120. In other words, the machine not only multiplies 1234 by 6, but simultaneously adds the product of such multiplication to the previously obtained amount 61700.

Provision may be made, if desired, to prevent the writing of the multiplicand when multiplying the same by the second and subsequent figures of the multiplier. This may be done by placing a shield over the paper, at the printing point, or by pressing the numeral key slowly, so that it will not print, or by other means; or, if desired, the platen may be line-spaced and the multiplicand may be written in a separate place each time that it is multiplied, to show that no error has been made in striking the numeral keys.

*Division.*—By moving the levers 168, 168$^x$, or either of them, to subtract, the operation of division may readily be performed, in the following manner:

Assuming that 75897 is to be divided by 356, the operator (noting that the devisor will go twice into 758), presses the key K which bears the number "2", and at the same time strikes successively the numeral keys bearing the numbers 356. The consequence of this operation will be that the machine will subtract twice "3", "5", "6" (or 712), from the 758 which forms the first part of the dividend; and therefore, the number 4697 will appear on the number wheels 120.

The operator, then noting that the divisor will go once into 469, simply touches the numeral keys "3", "5", "6", and the machine subtracts this from 469 which makes the first part of the number 4697, and the result thereupon shown on the number wheels 120 is 1137. The operator then notes that the divisor will go three time into 1137, and consequently presses the key K which is marked "3", while he again depresses the numeral keys 356. The machine accordingly subtracts three times 356, (or 1068) from 1137, leaving a remainder of 69, which shows on the numeral wheels 120. The quotient therefore is 213 69/356. In other words, the number 2 on the key K, which was first pressed back, forms the first digit of the quotient; the number 1, of course, forms the next digit; and the number 3, which was the last key K that was pressed back, forms the third digit. Regarding the second digit in this quotient, it will be understood that the mechanism was normally in condition to multiply the divisor by 1 and simultaneously subtract the product thereof from the dividend.

The invention as so far described, may of course be applied to other typewriting machines, as for instance, the Monarch typewriter, illustrated in my pending application filed August 16, 1907, No. 388,766. The operation of either multiplication or division may be facilitated by the use of the decimal tabulator, and line-by-line paper-feeding mechanism connected to said tabulator, described and illustrated in said application No. 388,766; to which reference is hereby made for a detailed description.

*Grouping.*—The figure wheels are visibly spaced into groups of three, each group, together with the spacing means, occupying four writing spaces of the typewriter. The spacing is preferably effected by the partitions, one of which is interposed between each group and the next, as shown in Figs. 13, 14, and occupies the fourth writing space, or a portion thereof. If it occupies less than a full fourth writing space, the three figure wheels which occupy the remainder of the four writing spaces of the group should be made correspondingly wider, but always so that the sum of the widths of the three figure wheels, together with that of the spacing means, is equal to four spaces of the typewriter.

The computing wheels are also divided into groups of three by the partitions, and the hub 138 of the computing wheel at the left of the group rotates in the spacing cylinder 134, which is of sufficient internal diameter to permit the actuating pins 145 to rotate freely therein. Hence said pins have no effect on the computing mechanism, in case the computing shaft should be rotated at the time the actuating pins are at any such fourth space in the computing mechanism. This arrangement provides that, without disconnecting the numeral key levers from the computing mechanism, the machine is free to operate at each fourth writing space without affecting the computing wheels, so that this space can be used for pointing off the hundreds from the thousands, the thousands from the millions, and so on, and for separating different columns, thereby avoiding any derangement of the computing mechanism, or error in the computation, through erroneously striking a numeral key at that point.

In order to ascertain at any desired time the points at which computation is taking place, either in the vertical or in the horizontal computing mechanism, there are provided movable pointers 185, which are each in vertical alinement with the actuator pins of the corresponding computing mechanism.

*Horizontal computing mechanism.*—The secondary mechanism is similar to that of the main in the relation of the computing wheels to the figure wheels, in the general construction of the transfer shaft, and in the clutch mechanism for shifting both the computing and transfer mechanisms into any one of three positions, to add, to subtract, or for throwing out of operation. The description, therefore, of such parts of the main computing mechanism as are also found in the horizontal computing mechanism applies also thereto, corresponding parts being indicated by the affix "×" for the horizontal computing mechanism.

One object of the horizontal computing mechanism is to furnish a cross computation of a row of figures whether added to, or substracted from, the several columns which are being computed by the main computing mechanism, as said figures are progressively written in said columns. This mechanism is also adaptable for a billing machine, that is, a machine by which there is obtained a balance of one or more columns in which some items are to be subtracted, as well as others added, the machine being provided with means for obtaining a horizontal computation of two or more rows, or a balance or difference of two numbers in a row, to write the total or difference in a separate column, and at the same time to reset the horizontal computing mechanism in readiness for similar operation, while still retaining the result of each such independent operation in a separate column, the vertical computation of which is retained in the main computing mechanism.

*Resetting and error correction.*—The means for reversing the direction of rotation of the actuator pins or master wheel 145 provides a convenient means for resetting to zero. This means may be of use either to correct the computation of a figure erroneously printed, or to clear a series of figure wheels to zero to begin a fresh computation. If, just before writing the result of any computation either vertical or horizontal of a series of numerals, the corresponding computing mechanism be reversed, then, at the time of so writing said result the figure wheels of that mechanism will be automatically set to zero, ready for the next computation.

The writing of the result of the cross-computation in this manner would bring the figure wheels of the horizontal mechanism to zero, at the same time adding it in a grand total column of the mechanism. The writing of the result of the vertical computation brings the figure wheels of the vertical computing mechanism to zero. The writing of the total of the grand total column has the same effect upon both the vertical and the horizontal computing mechanisms, and this result proves the accuracy of all the totals or balances in the vertical columns, in the horizontal rows, and in the grand total column. The above result is all accomplished in one continuous writing of the figures across the sheet in their respective columns, in the same way as matter is written in the ordinary manner by the typewriter when used for correspondence, the only other manipulation necessary being that of reversing the respective computing mechanism before writing any computation of a row or column.

The arrangement of reversing mechanism, both for the horizontal and vertical computing mechanisms, affords means for obtaining great variability in the character of the computations that may be effected thereby. For instance, there may be debit columns as well as credit columns, or each individual column, or certain of the columns may contain debits as well as credits, which could be written and computed without any explanation except the use of different colors, by a machine using a party-colored ribbon as, for instance, black for the debits and red for the credits.

In writing such figures in the several columns, representing the debits or credits as the case may be, the proper computations of such figures are simultaneously effected in the vertical and horizontal computing mechanisms as the figures themselves are written horizontally across the sheet in the various columns.

*Vertical actuator advance.*—Upon the rear side of the typewriter carriage is secured by arms 190, a rack 191, (Figs. 2, 12), which meshes with a pinion 192 upon a vertical shaft 193, suitably supported in the frame of the machine, on the lower end of which is secured a bevel gear 194 which meshes with a bevel gear 195 on a shaft 196 extending from the rear to the front of the machine, also suitably supported on the frame of the machine. On the front end of said shaft 196 is secured a pinion 197, (Figs. 24, 26), which meshes with a rack 198, which is secured to a frame 199, which has a sleeve 200 having a slot 201, which receives a feather 202 on a longitudinal rod 203, (Figs. 1, 2, 25, 27), within said sleeve, said sleeve being thus guided on said rod. Said rod 203 is supported upon the frame of the typewriter at one end by the plate 61, and at the other end by a bracket 205 secured to said frame. From the above construction it will be seen that said frame 199 moves with the typewriter carriage in a step-by-step movement but in the opposite direction thereto. To an extension 206 of said movable frame is secured the outer end of the tube 144 which moves the actuating pins 145, and into which the computing shaft 140 telescopes.

*Horizontal actuator advance.*—The tube 144$^x$ which advances the actuating pins 145$^x$ for the horizontal mechanism is connected to a cross piece 212, which is moved by a shifter arm 213, pivoted thereto, and is secured to a sleeve 214 which slides upon a rod 215 secured to the plate 61, and also to a plate 216 supported on the frame of the machine. Said tube 144$^x$ slides upon a fixed round shaft 217 secured at its left hand end in the plate 216, and in the right hand end of said shaft 217 rotates the end of the square computing shaft 140$^x$. Secured to said upper sleeve 214 is a pointer 218 which moves over the display opening 219 in the casing 159 for the register wheels and points to the register wheel which is in operative position. Secured to said cross piece 212 is a cord 220, which is wound around a barrel 221 actuated by a spring 222, said spring tending to draw said movable frame always to the left.

*Column stops.*—Secured on said frame 199 is a column stop bar 207 having formed therein a series of sockets 208. In any one of said sockets 208, can be secured by means of a screw 209, a column stop 210 having a projection 211 which, in the operative position of said column stop, projects downward, but, when the column stop is arranged so that the projection extends upward, said column stop is thereby rendered inoperative. The shifter arm 213 carries a shifter 224, having in its upper edge a notch 225, which is adapted to engage any of the projections 211 upon the column stops 210. Said shifter is normally pressed toward the column stop bar 207, by means of a spring 227, so that said notch 225 engages a projection 211 when it has arrived opposite thereto. When the notch 225 is so engaged by a projection, and the actuator frame of the vertical mechanism is moved to the right by the movement of the typewriter carriage to the left, the actuator frame of the horizontal mechanism is also moved to the right in unison with the movement of that of the vertical mechanism.

*Actuator return.*—Secured upon a stationary support 228 upon the frame of the machine is a short arm 229, upon the end of which is mounted a roller 230, and when the shifter arrives at said roller, the latter rides upon the sloping advancing edge 231 of said shifter and thereby depresses the shifter and its arm 213, which carries the same, against the action of said spring 227, releasing the notch 225 from the projection 211 on the column stop. When it is released, it is immediately retracted by the spring 227, which moves it to the left until the rear sloping edge 232 of the shifter impinges against the projection 211 of the next column stop to the left, which in its turn has been advanced into a position to engage said notch. On the rear side of the notch there is formed a low shoulder 233, the object of which is to prevent any recoil of the shifter when the shoulder 234 on the right of the notch strikes said projection, and also to lock the shifter in a position in which the projection 211 engages the notch 225, the spring 227 maintaining said projection and notch in engagement.

It will thus be seen that the actuating pins 145×, of the horizontal mechanism receive an intermittent advance in unison with the actuating pins of the vertical mechanism, the end of such advance being determined by the position of the roller 230, which position is such that the actuating pins always cease to advance when they have passed through the last of the computing wheels of the horizontal mechanism.

*Variable advance.*—The beginning of the advance of the actuator pins 145× is variably determined by the position of the column stops 210, which can be adjustably secured in the sockets in the column stop bar. This permits the cross-adding of columns located at different parts of the written page, considered widthwise. In said stop bar there is here shown a socket 208 at each fourth writing space, so that, wherever the column stops are placed, the master wheel or actuator pins of the horizontal mechanism are arrested at a point between two groups of computing wheels and commence the next advance from such point. Sockets 208' may also be provided in the column stop bar at each writing space as shown in Fig. 1. This is of advantage, when it is desired to use the horizontal mechanism by itself and independently of the vertical mechanism. It will readily be seen that the horizontal mechanism, while so called, is also equally well adapted for computing vertical columns and thus may be used for billing or other purposes.

When it is desired to use the vertical mechanism without producing any movement of the parts of the horizontal mechanism, a lever 236 is moved to the right, said lever having a pin 237 which bears down upon the upper edge of the pivoted arm 213, thereby depressing the shifter 224 so that its notch 225 cannot engage any one of the projections 211 of the column stops, and the column stop bar can reciprocate without said column stops producing any effect upon the horizontal computing mechanism.

*Variability of first column.*—When the frame 199 of the actuator pins 145 returns to the left with the movement of the typewriter carriage to the right for the purpose of beginning a new line of writing, a special stop 240 on the column stop bar impinges against a pin 241 secured upon the right hand end of a rack 242 which slides in a guideway 243, said rack engaging the upper side of a pinion 244, the lower side of which is engaged by a lower rack 245, which rack slides in a guideway 246, and therefore moves to the right as the said frame moves to the left. A spring 247 around the shaft of the pinion 244, normally moves the rack 245 to the left, and the rack 242 to the right. The rack 245 has a shoulder or extension 248 which, when it is moved to the right, engages a pin 249 extending from the shifter 224, and therefore moves to the right with said rack the arm 213 and the horizontal actuator pins 145× through the full distance of their travel to the right, and until the sloping advancing edge 231 of the shifter 224 is engaged by the roller 230, which thereupon depresses said shifter and detaches the pin 249 thereon from the shoulder 248 on the rack and releases the shifter therefrom, so that the arm 213 returns to the left under the action of the barrel spring 222. On its return it is arrested by the projection 211 on the first of the series of column stops engaging the notch 225 in said shifter, when the frame 199 re-commences its movement to the right and upper rack 242 follows its movement under the tension of the spring 247, until it reaches its normal position.

The object of the above arrangement is to permit a column of any width, from three to twelve figures, commenced at the first writing space of the typewriter to be computed in the horizontal mechanism along with the other columns of the same or greater or less width. Were this mechanism not provided, that result could not be obtained, for, although it would be possible to write a column, say, of three figures wide, at the extreme left of the writing space, and to actuate the first group of three wheels of the horizontal computing mechanism in correspondence with the writing of the figures of said column, yet said wheels so actuated would not be the proper wheels to be computed with other columns of greater width. For instance, hundreds, tens, and units might be added, respectively, to hundreds of thousands, tens of thousands and thousands. By the above contrivance it is provided that, when a column of three figures or less is to be computed at the extreme of the writing line, it is only the computing wheels on the extreme right of the horizontal computing mechanism that are actuated. If a column six figures wide is written, then the six wheels on the extreme right of the horizontal computing mechanism are actuated, and so on, thus assuring that, in all cases the computing wheels of the horizontal mechanism will correspond in denominational value to the several figures of the columns.

The commencement of the computation of such first column is controlled by the position of the first column stop to which the shifter returns at the end of its first movement when released from the rack upon the return of the typewriter carriage. The actuator of the horizontal mechanism then advances with the writing of the figures until the end of the horizontal mechanism is again reached, when the shifter is again tripped, and returns, and is arrested by the next column stop, the position of which, in its turn, determines the number of figures that may be written in the next column.

250 indicates a limit stop which arrests the movement of the horizontal actuator frame to the left, when it would not otherwise be arrested by a column stop.

In Fig. 33, I show a modification of the invention in which the horizontal mechanism is duplicated, the vertical mechanism being also shown, although it is understood that the vertical mechanism can either be used or not, as desired. This arrangement is very advantageous for billing purposes. For instance, the items of the bill may be set down in a column and computed by one of the mechanisms, say the upper, $159^x$, the lower one, $159^{xa}$, being at that time inoperative. When the lower mechanism is set for "addition", and the upper mechanism, $159^x$, is set for "subtraction", and the total is written down in another column, to the right or left of the first column, the upper mechanism is thereby reset to zero, while the total is retained in the lower mechanism. This operation may be repeated a number of times and the grand total obtained by the lower mechanism. Then, after so obtaining the grand total, the lower mechanism $159^{xa}$, may be set for "subtraction" and the grand total written down in a third column, thus resetting the lower mechanism to zero. Or, instead of pursuing the above method, a discount may be taken, or any amount deducted, from any one or more of the totals, the lower mechanism being at that time and for that purpose set for "subtraction", and by setting the lower mechanism to the inoperative position the balance may be placed in the third same or another column and at the same time retained in the lower mechanism.

It will readily be seen that either of said mechanisms can be operated, either for addition or for subtraction, the other being inoperative, or the two mechanisms, $159^x$ and $159^{xa}$, can both be used for addition or for subtraction, or either for addition and the other for subtraction.

When it is desired to increase the number of such columns and the successive operations, three or more such horizontal mechanisms $159^x$, $159^{xa}$, etc., can be used in the same manner.

Another method in which the construction shown in Fig. 33 can be used is that, the cross computation of each row of a large number of columns on the sheet, can be computed in one of the mechanisms, say the upper, $159^x$, and, as written, the computation can be transferred therefrom to the lower mechanism, at the same time resetting the upper mechanism to zero, the cross computations of such rows being retained and computed in the lower mechanism until the computation is complete.

One way of using the two computing heads 159 and $159^x$ seen at Fig. 1, for the purpose of multiplying, is to set the upper shift-lever 168 to a neutral position and to set the lower lever $168^x$ to position for addition. Any desired numbers then may be multiplied together upon the lower computing head $159^x$. The result may be written at any desired point upon the work sheet; and when such writing is done, the upper lever 168 may be shifted to adding position, so that such result will appear upon the number wheels 219 in the main computing-head 159, at the desired point. While said result is being thus placed upon the number wheels 120, the lower shift-lever 168× may be dropped to subtracting position, so that the number will be automatically subtracted from the lower number wheels 120×, thus bringing said number wheels to zero.

The operator may now again move the shift-lever 168 to neutral position and the lower shift lever 168× to position for addition, and proceed to multiply other numbers upon the lower computing-head 159×; and after obtaining a new result, he may proceed as before to add such result upon the computing-head 159, simultaneously subtracting such result from the computing-head 159×. The head 159 will then show the sum of the two results, while the head 159× will again show zeros. This operation may be repeated indefinitely; the products of the multiplication performed upon 159× being accumulated upon the computing-head 159. It will also be seen that several groups of the wheels 120 of the main adding head may be simultaneously employed for accumulating in separate columns such products as may be obtained by multiplication on the computing head 159×.

At Fig. 33, the products secured in the manner just described upon the computing-head 159× may be accumulated upon the lower computing head 159×a, or vice versa.

The device at Fig. 33 may be used either with or without the long computing head 159 shown in dotted lines. If the long computing-head is used, it will be understood that the vertical shafts 161, 161′ at Fig. 29 may be extended up, and the clutching and bevel gear mechanism may be duplicated, where required; as for instance, an additional set of beveled gears and clutches may be added to said shafts below the lower set but above the gear 162′, and may include a shift-lever 168×a, seen at Fig. 33. The computing head 159×a may be devoted to multiplying, and each result obtained thereon may be accumulated on the adding head 159 and simultaneously accumulated on the adding head 159′; such result being simultaneously subtracted from the computing head 159×a, as will be understood from the foregoing description. Thus, multiplication may be done upon 159×a, and the results may be accumulated in various columns along the adding head 159, and cross computation of said columns may be effected upon the adding head 159×; or the latter may give a cross balance, of the main columns, in case some of the latter are debit columns and others credit columns. The several computing heads may be otherwise used, either singly or together, as for instance in performing simultaneous multiplication and division, etc.

*Speed controls.*—By means of the escapement I provide two safety controls.

It is to be remembered that, at the time a numeral key is depressed, the actuating pins 145 are now within the computing wheel which is to be rotated by the next depression of said numeral keys, but are still within the computing wheel last rotated, or in a position to have been rotated, and that, before the computation to be effected by the depression of a numeral key takes place, it is necessary that the actuating pins be first brought into engagement with the computing wheel by which the desired computation is to be effected. If the rotary motion of the actuator pins were to commence before the said pins left the one computing wheel and entered the next, evidently confusion and incorrect computation would result. The object, therefore, of the first safety control is to prevent any rotation of the computing shaft before the typewriter carriage, which is the means of bringing said actuating pins into proper position, has completed its movement.

It is also evident that if a second numeral key were struck while the computing shaft and controller were still rotating, the proper stop bolt 67 in the controller might not be arrested by the stop wheel 71, and the computation would be rendered erroneous or the mechanism rendered inoperative. I therefore provide the following safety controls.

The escapement shaft 83 containing the disk 84, 85, is slidable longitudinally, and is pressed in a longitudinal direction by a spring 252. This spring operates to move the shaft forward longitudinally only in the intermediate position of the escapement wheel 89, when neither one of its points is engaging a disk on said shaft. As soon as a point of said escapement 89 passes through the notch 87 in the second disk, then the spring 252 acts to move the shaft 83 longitudinally, and it remains in this latter position for a time, which, however, is very minute, until the next point of the escapement wheel 89 strikes the first disk 84 on said shaft 83, and therefore again moves said shaft longitudinally against the pressure of said spring 252. To said shaft 83 is secured a plate 253, which in fact, forms an extension of the arm 82 to which is attached the link 81. When the escapement shaft 83 is rocked so as to permit the point of the escapement wheel which was in engagement with the second disk to pass through the notch therein, said plate 253 has, by the rocking of said shaft 83, been moved downward, and, as soon as said point passes through said notch 87, in the rear disk, the spring 252 moves the shaft 83 longitudinally into such a position that the upper edge of said plate 253 lies underneath a fixed pin 254 projecting from a bracket 255. The computation is completed when the next point of the escapement wheel arrives at the first disk 84 on the escapement shaft, and, if another numeral key be struck before the computation is completed, said key cannot be depressed, for the reason that the depression of said key can only be effected by rocking said escapement shaft 83 by means of the link 81, which cannot be done, because the plate 253 is still immediately beneath the pin 254, and therefore cannot be raised. But, as soon as said next point of the escapement wheel 89 impinges against the first disk of the escapement disk of the escapement shaft, then the pressure of said wheel 89 on said shaft 83, overcomes the pressure of the spring 252 and moves the shaft 83 against said spring, so that the edge of the plate 253 is now moved in a parallel direction from underneath the pin 254 so that said plate is free to move upward and the shaft 83 is free to rock and the numeral key can be depressed.

This speed control is not necessary for any ordinary usage of the machine, and is only included to make it absolutely impossible to produce an incorrect computation even if special efforts are made to do so, or to eliminate any possibility of overspeeding by which a result in the computation might be produced similar to that produced in excessively rapid writing, when one letter is written partly over another because the carriage has not completed its movement before the next printing takes place.

The second safety control is effected by the following mechanism: The plate 253 is extended and bent at right angles to form a lip 255ª, the lower edge of which lip is adapted to be engaged by a notch 256, formed in a latch 257 pivoted at 258 to a bracket 259 secured upon the plate 61. Said latch is normally pressed toward said lip by means of a spring 260, and is connected by a link 261 with an arm 262 on a rock shaft 263 having suitable bearings on the frame of the machine, (one only shown,) said rock shaft 263 carrying an upwardly extending arm 264, to the upper end of which is connected a link 265 which slides in a guideway 266, and carries a roller 267. Said roller is adapted to enter the recesses between the teeth of the escapement wheel 268 of the typewriter. When the roller is in one of said recesses, in the normal position of rest, the lip 255 is beneath a beveled edge 269 of the latch, but, upon the depression of a numeral key and the rocking of the escapement shaft, the upper edge of said lip 255 engages said beveled edge, and while depressing said latch rises to a position above said notch 256. By the movement of the typewriter escapement wheel 268, which presses outward said roller 267, the latch 257 is withdrawn at the time that the roller 267 is at the extreme point of the tooth on said escapement wheel. The parts are in such position when the numeral key is held down, as shown in Fig. 12ª. The release of the numeral key simultaneously permits the escapement shaft 83 to rock, which it does under the action of the spring 79, and at the same time allows the roller 267 to pass the point of the typewriter escapement wheel, and thereby allows the spring 260 to move the latch 256 inward against the lip 255 of the plate 253. But, on account of the downward movement of said plate 255 simultaneously with the rocking of the escapement shaft, said latch 257 cannot now prevent said downward movement. All of this has been completed before the point of the escapement wheel 89 can pass through the notch in the second disk, so that the carriage has completed its movement before the computing movement begins.

*Fourth space lock.*—It has already been explained that while, on the depression of a numeral key when the printing point is at each fourth writing space of the typewriter, the numeral will be printed, the computing mechanism will not thereby be affected, because, although the actuating pins are, at the time of such depression, within the third wheel of the group of three computing wheels to the left, yet, upon the release of the numeral key and the consequent movement of the typewriter carriage, said actuating pins move into the open space between the groups of computing wheels in which they are inoperative; consequently at that point no computation takes place through the rotation of said shaft. However, a common error in writing columns of figures is to write a numeral, out of place, in the space between the groups, or instead of the comma or other character defining the grouping, and were suitable means not provided, the result would be that an operator, having made this error, might continue writing the column without observing the error, receiving the whole computation incorrect, the correction of which would be difficult and complicated. This error would be more especially likely to take place when the typewriter is used with a decimal tabulating mechanism such as in common use with standard typewriters, through an error of the operator in using the wrong tabulating key, such as the tens for the hundreds, or the units for the tens, in which case the figures would occupy the wrong position in the column. It is therefore desirable to provide means for absolutely preventing the depression of a numeral key in such fourth typewriting space, when figures are being printed and the computation is being effected, without interfering with the use of the numeral keys to print the other characters which are printed thereby, even when the computing mechanism is in use.

For this purpose, there are secured upon the rack 191 pins 271 spaced apart four typewriter spaces, and, adapted to engage any one of said pins, is the beveled end of a plate 273 hinged, as shown at 274, to the end of a lever 275. Said plate is maintained in the same plane as said lever when in operative position by means of a hooked latch 276, which, however, can be dropped, whereupon the plate 273 can be swung out of line with the lever 275 and will then not engage said pins 271. The plate 273 is hinged in order that it may be permanently disengaged from the rack 191 in the to and fro movement from the typewriter carriage when not computing. Said lever 275 is suitably pivoted upon the rear of the frame, as shown at 277 and the other end thereof is pivoted to a lever 278, pivoted at 279 upon the frame of the machine, the other end of which is connected to the top of a slide rod 280, which slides through a bracket 281 secured to the plate 2 and normally raised by a spring 282. When said rod 280 is depressed, it is moved into a position in front of the end of the bar 76, which, as already explained is moved to the left by the depression of any numeral key, so that, in the depressed position of the slide rod 280, the bar 76 is locked against such movement, and therefore also every numeral key is also locked thereby. Since the rack 191 moves to the left with the typewriter carriage, each time that the printing point is at each fourth writing space of the typewriter one of the corresponding pins 271 engages the plate 273 on the end of the lever and depresses the same, thereby depressing the rod 280, and thus locking the numeral keys against depression.

However, this construction will not prevent the writing of any other character except the numeral, or the writing of the alternate character carried by the numeral key, as these are written by means of the shift key, and when using the shift key, the connections from the keys to the computing mechanism are thrown out of operation. In case it is desirable to write a figure in any fourth space without permanently disconnecting the key in each fourth writing space, the depression of the temporary reverse key would have the same effect.

*Computing mechanism movement.*—Although means have been shown for disconnecting the computing mechanism from the numeral keys, yet this would not prevent the computing mechanism reciprocating with the typewriter carriage, which would be a useless movement. In order to avoid the latter result, there is provided a lever 286 pivoted at 287 on the yoke 288 which is at present provided for the Remington decimal tabulator. Through said lever 286 passes the shaft 193, so that, by rocking said lever, said shaft 193 and the gear wheel 192 can be shifted so that the teeth of the latter are out of mesh with the rack 191. A pin 289 upon the yoke 288 entering in a slot 290 on the lever 286 limits the movement of the lever, which is operated by a knob or handle 291. When the lever has been shifted, so that the gear wheel 192 no longer engages the rack 191, then the carriage 199 of the operating mechanism and the tabulator bar no longer move with the typewriter carriage.

When it is desired to again connect the mechanism, the typewriter carriage is moved to the extreme right and the carriage 199 is moved to the extreme left, and than a fork 292 carried by a spring 293 is caused to straddle the end plate of the carriage 199 for the purpose of centering the same, so as to insure that, when the lever 286 is again moved, to cause the gear 193 to engage the rack 191, the teeth thereof will properly mesh with each other. The spring is then released, whereupon the fork 292 is disengaged from the end plate of the carriage 199 so that the carriage is properly centered and can travel freely with the movement of the typewriter carriage.

The operation for either multiplication or division may be facilitated by the use of the decimal tabulator described and illustrated in my application for computing machine and attachment to typewriters filed August 16, 1907, No. 388,766, to which reference is made for a detailed description of the same.

*Disconnection of types from keys,* (Figs. 35 to 38.)—The levers 3, bearing the numeral keys, are connected to the type-bars 294 by means of links 295. In order to effect disconnection, there is provided a horizontal bar or rack 296, having at its ends slots 297, whereby it is mounted on headed studs or screws 298, secured upon the sides of the base 1 of the typewriter, said rack having a finger piece 299, whereby it may be shifted endwise. This rack or bar has forwardly extending fingers 300, each of which may be forked or slotted at 301, to bestride a hook 302 which is attached to the lower end of the link 295, to shift the same laterally, or in a direction across the key lever system, to disengage it from the strap 303, which is attached to the lever 3. When the rack 296 is pulled from the position at Figs. 36 and 37 to that at Fig. 38, the hooks 302 are shifted out of engagement with the eyes 304 in the straps 303, so that the keys may be manipulated for computing purposes without writing. This feature is of particular service in connection with multiplication, division, etc. A detent spring 305 engages notches 306 in the edge of the bar 296 to hold the latter in either position.

It will be seen at Fig. 36 that the key for the zero type is also controlled by the shifter bar, so that no zeros can be written during the computation, even though the zero key is not connected to means for rotating the computing mechanism. It will be understood, that when the parts are at the Fig. 38 position, the carriage continues to feed, because the usual escapement for said carriage is controlled by the key levers, although the types do not print. The positions of the usual connections of the letter-types is indicated in dotted lines at 302ª, Fig. 36.

Variations may be resorted to within the scope of the invention, and portions of the improvements may be used without others.

Having thus described my invention, I claim:

1. The combination of computing mechanism and a computing shaft therefor, pinions on said shaft, a driving shaft, pinions thereon, means for rotating the driving shaft, a series of pairs of gears of different gear ratio between said driving and computing pinions, and clutches for making an operative connection between said shafts through any pair of said gears exclusively of the others.

2. The combination of computing mechanism, a computing shaft therefor, a driving shaft, means for rotating said driving shaft, a series of gears adapted to be rotated by the driving shaft, a corresponding series of gears adapted to rotate the computing shaft, and meshing respectively with the gears of the former series, a corresponding series of clutches for connecting each gear of the series with its shaft, and a series of keys for controlling said connecting clutches, substantially as described.

3. The combination of computing mechanism, a computing shaft therefor, a driving shaft, means for rotating said driving shaft, a series of gears adapted to be rotated by the driving shaft, a corresponding series of gears adapted to rotate the computing shaft, and meshing respectively with the gears of the former series, a corresponding series of clutches for connecting each gear of the series with its shaft, one of said clutches being normally in operative condition, and means for disconnecting the latter clutch when connecting any one of the other clutches, and for automatically reconnecting it when disconnecting said other clutch.

4. In combination, a set of computing wheels or computing heads, a power-driven master wheel therefor, a key-controlled escapement mechanism, a system of back-gearing between the escapement mechanism and the master wheel, and keys having means to throw into operation any set of back gears to the exclusion of the others; said system comprising pinions connected to said escapement mechanism, pinions connectible to said master wheel, and interposed pairs of gears to mesh with said pinions.

5. In combination, a set of computing wheels or computing heads, a power-driven master wheel therefor, a key-controlled escapement mechanism, a system of back-gearing between the escapement mechanism and the master wheel, and keys having means to throw into operation any set of back gears to the exclusion of the others, said system of back gears including primary drivers each of which forms a member of a train, said trains being all normally disconnected from the computing mechanism, and each train including a pinion connectible by its key to said master wheel, and gears between said pinion and its primary driver.

6. In combination, a set of computing wheels or computing heads, a power-driven master wheel therefor, a key-controlled escapement mechanism, a system of back-gearing between the escapement mechanism and the master wheel, and keys having means to throw into operation any set of back gears to the exclusion of the others, said system of back gears including primary drivers each of which forms a member of a train of back-gearing, said back-gearing trains being all normally disconnected from the computing mechanism, and each key having means to clutch both the primary gear and the member at the other end of its train of back-gearing.

7. In combination, a set of computing wheels or computing heads, a power-driven master wheel therefor, a key-controlled escapement mechanism, a system of back-gearing between the escapement mechanism and the master wheel, keys having means to throw into operation any set of back gears to the exclusion of the others, said system of back gears including primary drivers each of which forms a member of a train of back-gearing, said back-gearing trains being all normally disconnected from the computing mechanism, and each key having means to clutch both the primary gear and the member at the other end of its train of back-gearing, and means normally holding said train of back-gearing against revolution.

8. In combination, a set of computing wheels or computing heads, a power-driven master wheel therefor, a key-controlled escapement mechanism, a system of back-gearing between the escapement mechanism and the master wheel, keys having means to throw into operation any set of back gears to the exclusion of the others, and a train of gears normally connecting said escapement wheel and said master wheel, each of said keys having means to disconnect said train.

9. The combination with alphabet and numeral keys, type-bars and connections from the keys to the type-bars, a plurality of computing heads, means for separately connecting said heads to the numeral keys, and means for disconnecting only the numeral type bars and the zero type bar from the keys, said disconnecting means including a rack to engage said connections for disabling the same.

10. In a combined typewriting and computing machine, the combination with numeral keys, computing wheels, and a motor for driving said computing wheels, of a plurality of sets of gears of different ratios intermediate said motor and wheels, said gears being constantly in mesh, and a clutch intermediate each gear and the motor.

11. In a combined typewriting and computing machine, the combination with numeral keys, computing wheels, and a motor for driving said computing wheels, of a gear connecting said motor to said wheels, a clutch holding said gear to turn said wheels, a plurality of sets of gears of different ratios between said motor and wheels, all of said gears being in mesh, a clutch for every set of gears, means holding one clutch normally effective, and means releasing said clutch when any other clutch becomes effective.

12. In a multiplying machine, the combination with computing wheels and a motor, of a shaft driven by said motor, a shaft for turning said computing wheels, a fixed shaft, a plurality of idle gears on said fixed shaft, a plurality of loose gears on said driven shaft meshing with said idle gears, a plurality of third gears meshing with said idle gears for turning said computing wheel shaft, said driven shaft gears each arranged to drive said computing wheel shaft at a different speed, a clutch for each of said driven shaft gears, one of said clutches normally locking its gear to its shaft, and keys for releasing said clutch and selectively operating the remaining clutches.

13. In a multiplying machine, the combination with computing wheels, and a motor, of a shaft driven by said motor, a shaft for turning said computing wheels, a fixed shaft, a plurality of idle gears on said fixed shaft, a plurality of loose gears on said driven shaft meshing with said idle gears, a plurality of third gears meshing with said idle gears for turning said computing wheel shaft, said driven shaft gears each arranged to drive said computing wheel shaft at a different speed, a clutch for each of said driven shaft gears, a clutch for each of said computing shaft gears, means for coupling the clutches in each train of gears, one of said couples normally locking its gears to its shafts, and keys for releasing said coupled clutches and selectively operating the remaining clutches.

14. In a combined typewriting and computing machine, the combination with numeral keys, computing wheels and type operated thereby, of means for disconnecting said keys from said type, a computing machine escapement, means for separately disconnecting said keys from said escapement, a totalizer, means for causing said totalizer to be so connected to said escapement that it will multiply, add, subtract, or be neutral with reference thereto, a second totalizer, and means for connecting said second totalizer to said escapement so that it will cause said second totalizer to be so connected to said escapement that it will add, subtract, or be neutral with reference thereto, whereby numbers to be multiplied may be computed on said first mentioned totalizer, without being printed, and whereby the number standing on either totalizer may be printed without operating said escapement mechanism.

15. In a combined typewriting and computing machine, the combination with numeral keys and computing wheels, of multiplying gears, adding gears through which said keys normally control said wheels, multiplying keys, and a universal bar operated by said multiplying keys for simultaneously connecting said multiplying gears so that said keys control said wheels through said multiplying gears, and for automatically disconnecting the addition gears.

16. In a computing machine, the combination with numeral keys and computing wheels, of multiplication gears insertible between said keys and wheels, addition gears normally connected to drive said computing wheels, and means for automatically disconnecting said addition gears whenever a multiplying gear is made operative.

17. In a computing machine, the combination with numeral keys and computing wheels, of means for driving said computing wheels, multiplication gears between said wheels and said driving means, addition gears through which said driving means is normally connected to said keys, and means for automatically disconnecting said addition gears whenever a multiplying gear is thrown into mesh.

18. The combination with a plurality of computing wheels, of a master wheel for driving said computing wheels, tens-carrying mechanism for said computing wheels, a motor for driving both said tens-carrying mechanism and said master wheel, a selective multiplying train between said motor and said master wheel, enabling multiplying computation to be run into said computing wheels, and a simple direct drive between said motor and said tens-carrying mechanism, enabling the carrying of tens for any particular drive ratio between said motor and said master wheel.

19. In a computing machine, the combination with a series of computing wheels, of valuating mechanism for controlling amounts of movements of said wheels, connections from said valuating mechanism to said wheels normally connected in simple gear ratio, a series of multiplier keys, and means controlled by any of said keys to vary said gear ratio to differently control said computing mechanism from said valuating mechanism to perform multiplication.

20. In a computing machine, the combination with a series of computing wheels, of valuating mechanism for determining amounts of movements of said wheels, connections from said valuating mechanism to said wheels normally connected in simple gear ratio, a series of driving trains of different gear ratios, a series of multiplier keys, each corresponding to a different gear ratio, and means controlled by any multiplier key for breaking the simple gear ratio connection between said computing wheels and said valuating mechanism and establishing a train of gear ratio corresponding to that of the key operated.

WALTER WRIGHT.

Witnesses:
K. FRANKFORT,
C. RIPLEY.